(12) United States Patent
Dove et al.

(10) Patent No.: US 7,044,371 B2
(45) Date of Patent: May 16, 2006

(54) PASSENGER MONITORING SYSTEM AND METHOD

(75) Inventors: Karen Dove, Dallas, TX (US); Don Harris, Mansfield, TX (US); Robert Shaffer, Plano, TX (US); Steve Weidman, Hickory Creek, TX (US); John Zuzu, Haslet, TX (US)

(73) Assignee: Southwest Airlines Co., Dallas, TX (US)

( * ) Notice: Subject to any disclaimer, the term of this patent is extended or adjusted under 35 U.S.C. 154(b) by 75 days.

(21) Appl. No.: 10/718,317

(22) Filed: Nov. 20, 2003

(65) Prior Publication Data

US 2005/0109843 A1   May 26, 2005

(51) Int. Cl.
*G07B 15/02* (2006.01)
(52) U.S. Cl. .................. 235/384; 235/382; 235/435
(58) Field of Classification Search ............... 235/384, 235/375, 492, 435, 380, 382; 705/5; 340/10.1, 340/573
See application file for complete search history.

(56) References Cited

U.S. PATENT DOCUMENTS

| | | | |
|---|---|---|---|
| 6,493,610 B1 | 12/2002 | Ezaki | |
| 6,509,829 B1 * | 1/2003 | Tuttle | 340/10.1 |
| 6,557,752 B1 * | 5/2003 | Yacoob | 235/375 |
| 6,726,109 B1 * | 4/2004 | Yamagishi et al. | 235/492 |
| 6,865,539 B1 * | 3/2005 | Pugliese, III | 705/5 |
| 6,873,260 B1 * | 3/2005 | Lancos et al. | 340/573.1 |
| 2003/0093305 A1 * | 5/2003 | Davis et al. | 705/5 |

OTHER PUBLICATIONS

Sabre Inc., Sabre Passenger Reservation System, printout from www.sabreairlinessolutions.com/supporting_files/s2_004308.pdf, date of copyright notice—1999, pp. 1-2.
Sabre Inc., Sabre ACSI, printout from www.sabreairlinessolutions.com/supporting_files/s2_004317.pdf. date of copyright notice—1999, pp. 1-2.
Sabre Inc., Sabre Aerodynamic Traveler Gate Reader Module, printout from www.sabreairlinessolutions.com/supporting_files/s2_004332.pdf, date of copyright notice—2000, pp. 1-2.
HUMANSCALE, M7 Flat Panel Monitor Arms—product information sheet, no date listed, pp. 1-4.

* cited by examiner

*Primary Examiner*—Steven S. Paik
(74) *Attorney, Agent, or Firm*—Grady K. Bergen; Pamela S. Smith

(57) ABSTRACT

A system and method for monitoring passengers during boarding or disembarking of a passenger carrier is provided. This includes providing a passenger monitoring system at a gateway area for boarding or disembarking of a passenger carrier for a designated carrier event. The passenger monitoring system may include a passenger data collecting device, an instruction input device, a video monitor display device and a data processor that is in communication with a remotely located central database containing stored carrier and passenger data for the carrier event. Passenger boarding or disembarking data from at least one passenger is collected during boarding or disembarking operations at the gateway area with the passenger monitoring system. The stored carrier and passenger data is updated with the collected data. The stored carrier and passenger data is displayed on the display device of the passenger monitoring system upon inquiry instruction input into the instruction input device.

17 Claims, 20 Drawing Sheets

PASSENGER MONITORING SYSTEM AND METHOD

TECHNICAL FIELD

The invention relates generally to methods and systems for the monitoring of passengers of passenger carriers and carrier events.

BACKGROUND

Commercial passenger carriers for transporting passengers to and from various locations may have some form of database for tracking carrier, ticketing and passenger information. This is particularly true for commercial airlines. The information may be provided in a central database, which may be accessible to a ticketing agent at ticketing and check-in areas at airports. Such check-in areas may be remote from gate areas where boarding and disembarking of passengers for the individual flights occurs, however. Thus, this information is may not be available at boarding or gate areas where passengers board and disembark from the passenger carrier. Additionally, the information contained in these databases may not include detailed information regarding the boarding or disembarking of individual passengers, such as whether or not the passenger has actually boarded or disembarked from the passenger carrier.

When traveling upon commercial passenger aircraft, passengers are often provided with boarding passes. These may be issued by the ticketing agent during check-in or they may be provided in advance upon the purchase of the ticket. The boarding pass may be tendered by the passenger at the gate area during boarding operations of the passenger carrier. The boarding pass indicates that the passenger is authorized to board the particular flight or carrier event. Collecting of boarding passes by a gate agent ensures that unauthorized passengers do not board the flight. The gate agent may visually inspect the boarding pass to ensure that the passenger tendering the boarding pass is on the correct flight. After they are collected, the boarding passes also provide a means for monitoring the total number of passengers that may have boarded. The gate agent or overseer may manually count the boarding passes and compare them to the number of boarding passes issued for the flight to determine if all passengers have boarded. If the number of boarding passes issued is greater than the boarding passes collected, the boarding passes may have to be sorted to determine which passenger(s) have not boarded. Such methods can be time consuming and may delay the departure of the flight or carrier event.

Boarding operations have been automated in some cases wherein the boarding passes may be provided with a magnetic stripe that contains information that is read by a magnetic stripe reader. Such readers may be provided with a light and/or audio indication to indicate that the stripe of the boarding pass was read and that indicates that the passenger is authorized to board. Such readers do not, however, provide any detailed information at the gate area other than that the boarding pass is valid for the particular flight or carrier event.

BRIEF DESCRIPTION OF THE DRAWINGS

For a more complete understanding of the present invention reference is made to the following descriptions taken in conjunction with the accompanying figures, in which.

DETAILED DESCRIPTION

Figure 1:
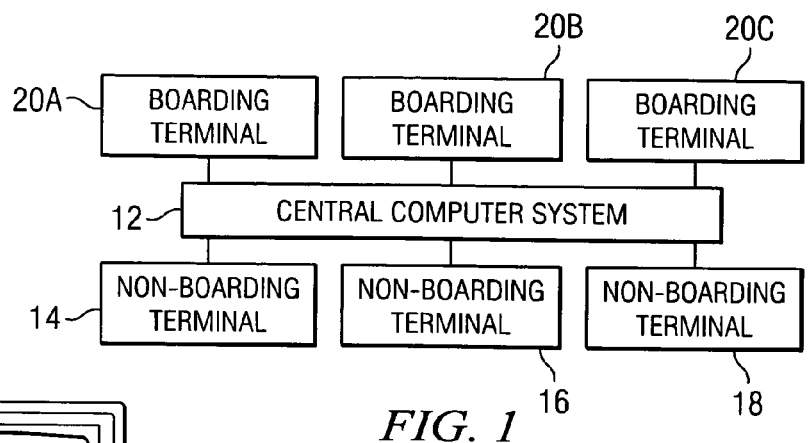
FIG. 1 is schematic representation of a passenger monitoring system in accordance with the invention.
Figure 4:
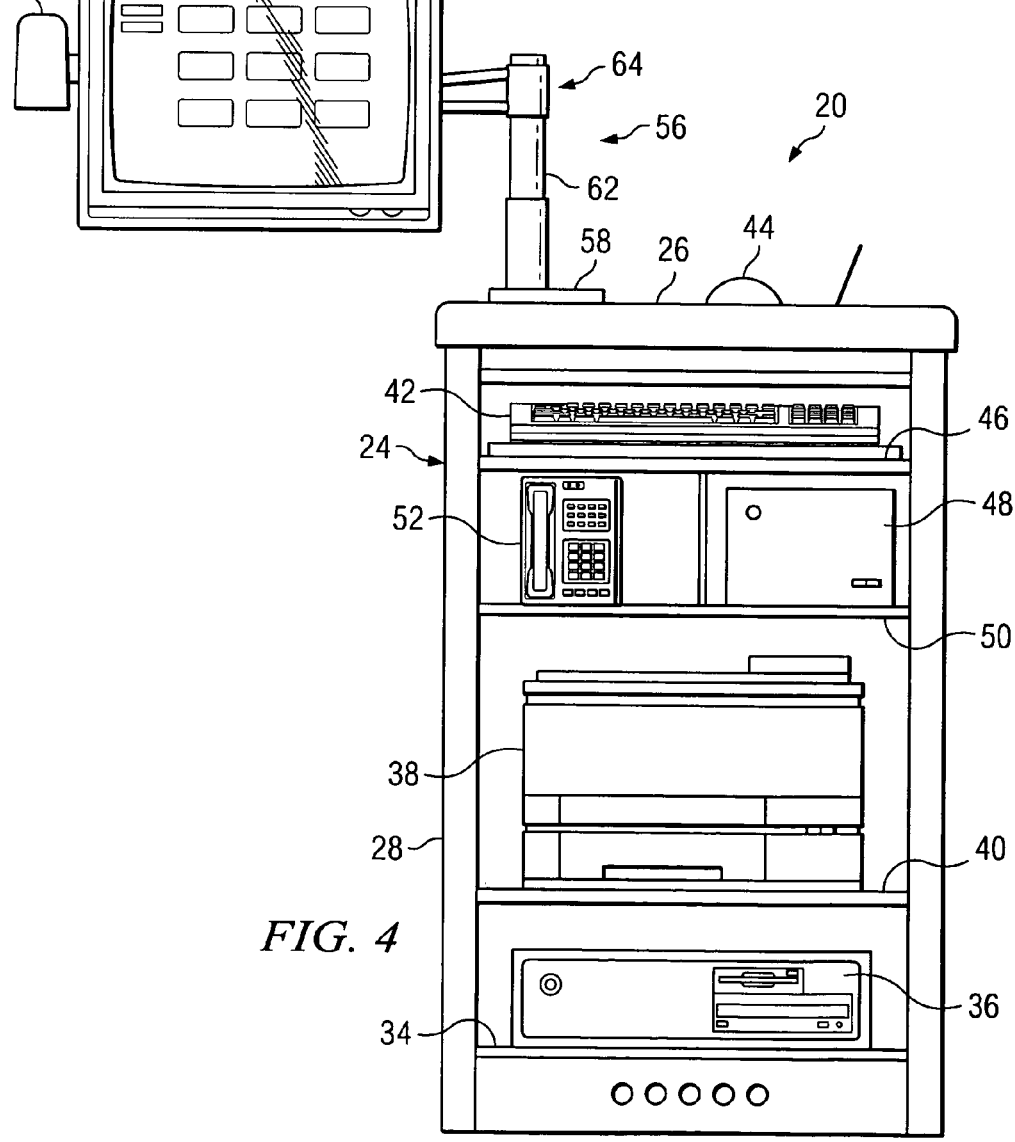
FIG. 4 is a rear elevational view of the passenger monitoring system terminal of FIG. 2.

Referring to FIG. 1, a representative schematic of a passenger monitoring system 10 is shown. The system 10 includes a central computer system designated at 12 having a central database. The central computer system 12 may be a single system or a network of individual systems or computers and may include a reservation or flight tracking system or application for the tracking and monitoring of a plurality of individual passengers, carriers and carrier events. For ease of description, reference may be made to systems and methods related to commercial passenger air carriers, for which the system and method is particularly well suited. It should be noted, however, that the method and system described herein may have application to other types of passenger carriers as well.

The central computer system 12 may be coupled or networked to a plurality of remote ticketing, check-in or other non-boarding terminals or systems 14, 16, 18 wherein passenger, reservation and flight information may be entered into and accessed from the central database of the system 12. Such non-boarding terminals may be numerous and be located over a wide area, including nationwide and worldwide, to facilitate tracking and monitoring of all passengers, carriers and carrier events for a particular carrier or carriers.

Figure 2:
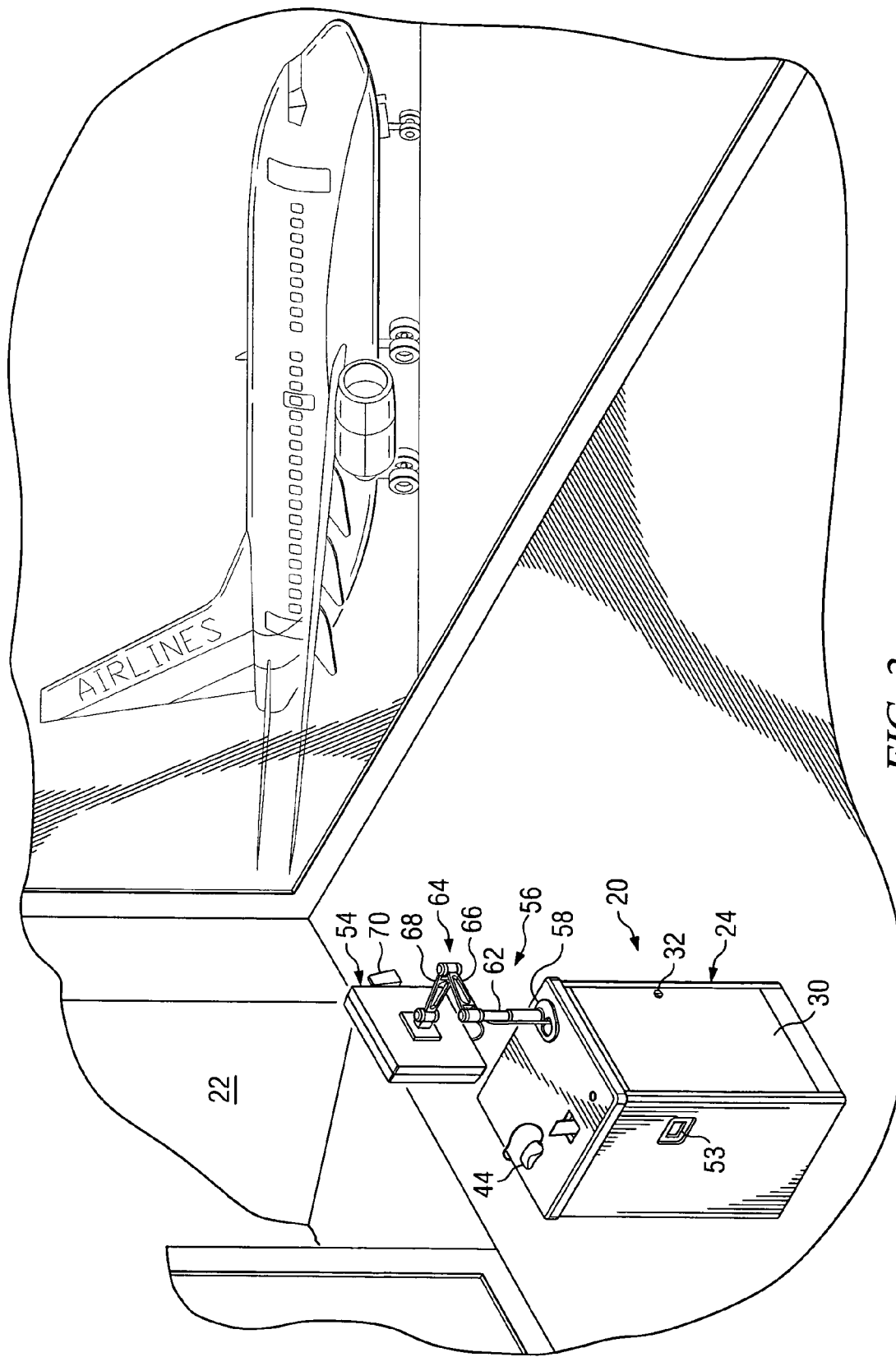
FIG. 2 is a perspective view of a gate area of a passenger air carrier provided with a passenger monitoring system terminal of the passenger monitoring system of FIG. 1.

Also coupled or networked to the system 12 are one or more passenger boarding and/or disembarking monitoring terminals or systems 20, designated individually in FIG. 1 as terminals 20A, 20B and 20C. The terminals 20 (FIG. 2) may be located at a gateway area positioned near a gateway for boarding and disembarking, such as adjacent to the ramp doorway or entrance 22, or along a checkpoint area along which passengers must pass during boarding or disembarking operations for individual flights or carrier events.

The boarding terminal 20 includes a cabinet or podium structure 24 for supporting and housing the various components of the system 20. The podium 24 may include an upper desktop or work surface 26, opposite sidewalls 28, and front wall 30. In the embodiment shown, the podium 24 is of sufficient height to provide the work surface 26 at a level that is easily accessible to a user while working from a standing position. The desktop 26 may be provided with a receptacle 31 for conveniently holding items therein. The front wall 30 (FIG. 2) may include or be in the form of a door or opening that is pivotally mounted along one side to allow access to the interior of the cabinet 24 from the front, if necessary. A locking mechanism 32 may be provided to prevent unauthorized access to the cabinet interior.

Figure 3:
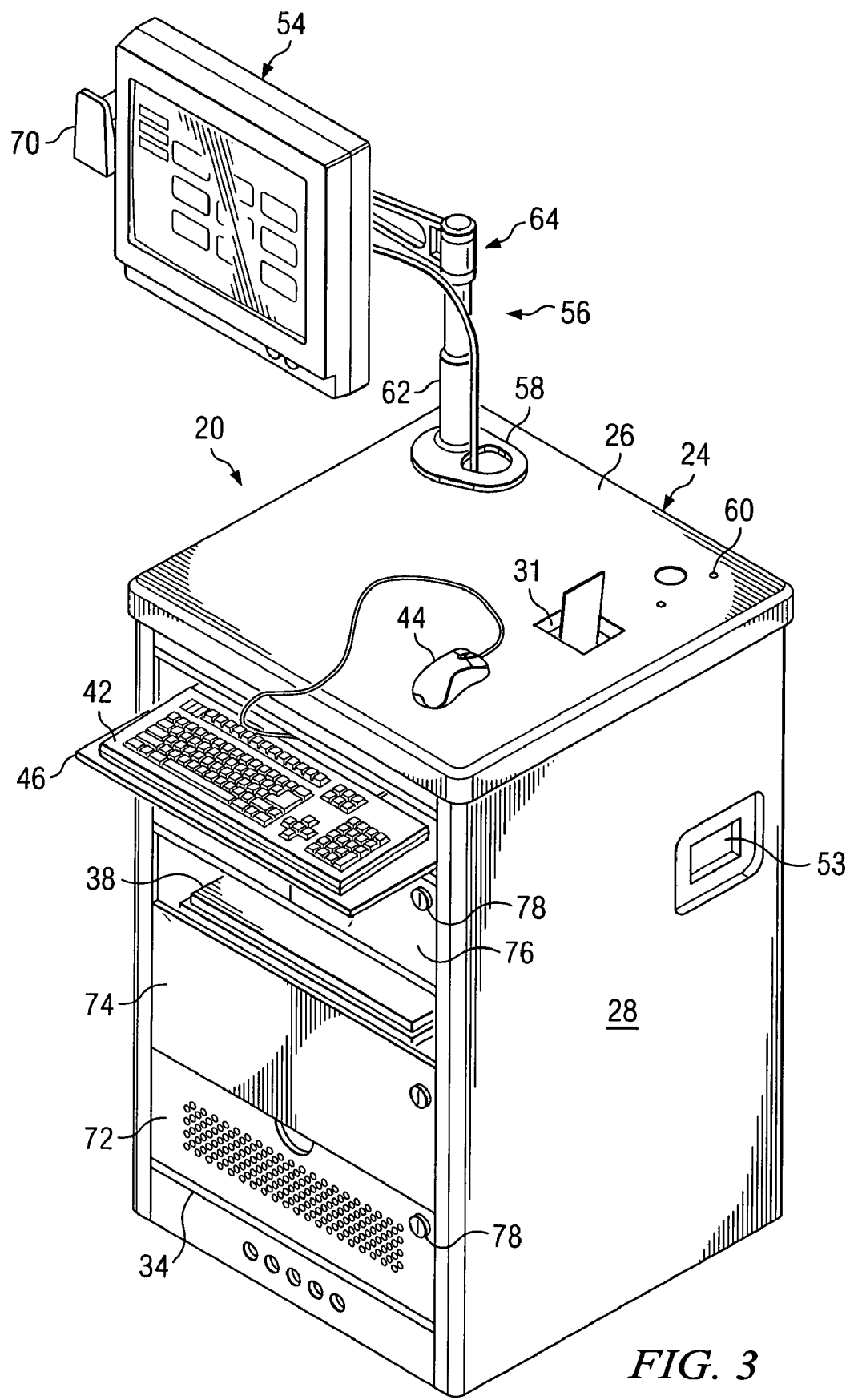
FIG. 3 is a rear perspective view of the passenger monitoring system terminal of FIG. 2.

Referring to FIG. 3, the rear of the cabinet may have an opening to provide access to the cabinet interior. The cabinet 24 may be provided with several drawers or shelves, which may be stationary or movable, for conveniently housing and supporting various components of the boarding system 20.

As shown, housed within the interior of the cabinet 24 and shown supported on a lower or bottom shelf 34 is a computer 36. The computer 36 may be a personal computer, such as a desktop computer that may be provided with a hard drive, processor, memory, video and sound cards, internal speakers, floppy and removable drives, connection ports, drivers and other components that are typically provided with such computers. The computer also contains one or more programs or applications to allow the monitoring system to operate as is described in further detail later on. The computer 36 is connected to the central computer system 12, such as through a wireless or non-wireless network.

A printer device 38 may be connected to the computer 36 and be supported on shelf 40. The shelf 40 is a movable shelf, sliding or moving laterally into and out of the interior of the cabinet to facilitate access to the printer 38. A keyboard 42 and mouse 44 may also be connected to the computer 36. The keyboard 42 may rest on a movable keyboard tray or shelf 46 that moves or slides laterally into and out from the interior of the cabinet 24. The keyboard tray 46 may be at a height or position that facilitates operation of the keyboard 42 while the user is standing. The mouse 44 may be supported on the work surface 26 or may be positioned on a portion of the tray or shelf 46 or other shelf or support structure of the cabinet 24.

A secondary printer device 48 is supported on shelf or support surface 50 located above the printer 38 and is connected to the computer 36. In the embodiment shown, the secondary printer 48 may be used to print baggage tags or similar printed devices. The printer may be oriented so that tags or printed devices may be fed from the printer 48 from the interior of the cabinet 24 through a slot or opening 53 provided in the sidewall 28 where the printed tags or devices may be accessed.

A telephone or other audio communication device 52 may be provided with or housed within the cabinet 24. Other drawers, shelves or compartments within the cabinet interior for storing or housing other items may also be provided.

Mounted to the podium 24 is a monitor or display device 54. The monitor 54 is mounted by means of an articulable arm 56. The monitor 54 may be a video display monitor, such as those used with personal computers, that is capable of displaying various images or graphics. The arm 56 includes a base 58 that is secured to the upper portion of the cabinet 24. Holes, such as the holes 60 (FIG. 3), or other mounting structures may be formed or provided with the cabinet 24 so that the arm 56 can be mounted to one side or the other, as desired. The arm 56 includes an upright portion 62 that is extendable so that it can be raised or lowered to selected positions. Coupled to the upper end of the upright portion 62 is a pivotable lateral arm 64 formed from pivotable segments 66, 68. The arm 56 allows the monitor 54 to be pivoted or positioned at various positions and orientations to facilitate ease of use.

In the embodiment shown, the monitor 54 is a flat panel, touch screen monitor, which is connected to the computer 36. An example of a suitable commercially available monitor includes the ENTUITIVE 1525L 15 inch LCD Desktop Touch Monitor, available from Elo TouchSystems, Fremont, Calif.

A reader 70 for reading data-items may be mounted to the arm 56 or to the monitor 54 and is connected to the computer 36. The reader 70 may be an optical scanner or image reader, an RFID reader or other device capable of reading a passenger-data item that is brought within a proximal distance to the reader 70. In the embodiment shown, the reading device 70 includes an optical or image reader that projects a scan field for reading bar codes. The bar code may include a one-dimensional code, such as a Code-93 or Code 128 bar code; a two dimensional matrix or bar code, such as the PDF417 two-dimensional code; or even a three-dimensional (raised) code. A radio frequency identification device (RFID) or other readable data-containing device that may be read when brought into proximity to a compatible reader may also be used. The reader 70 may provide a read confirmation in the form of audible and/or visual output or a combination of such output, to indicate a successful or unsuccessful read or scan operation.

Referring to FIG. 3, rear doors or covers, such as doors 72, 74, 76, that are hinged or pivotally connected at one side to the cabinet 24 facilitate covering the rear opening of the cabinet 24 and enclosing the items housed within the cabinet 24. These doors, as well as drawers, may be provided with locking mechanisms, such as the locking mechanism 78, to prevent unauthorized access to the enclosed items. The doors may only partially enclose certain openings, such as the door 74 that encloses the printer 38. In this way, access to printed documents from the printer 38 may be made while preventing unauthorized removal of the printer.

The following provides further description of the operation of the boarding/disembarking terminal and passenger monitoring system.

When the boarding/disembarking terminal is powered on and the passenger boarding/disembarking application is loaded, an initial logon screen 79 (FIG. 5) will appear on the monitor 54 to allow the central system 12 to be accessed. Logon will typically be made by a gate agent or one responsible for overseeing boarding or disembarking operations. User ID and password fields 80, 82 are provided on the logon screen 79 to facilitate identifying of the agent or persons conducting the boarding/disembarking operations and to prevent unauthorized access to the system. Manually entering information and instructions into the system may be accomplished by touching the appropriate areas of the touch screen monitor 54, by means of the keyboard 42 or mouse 44, or a combination of these.

Figure 6:
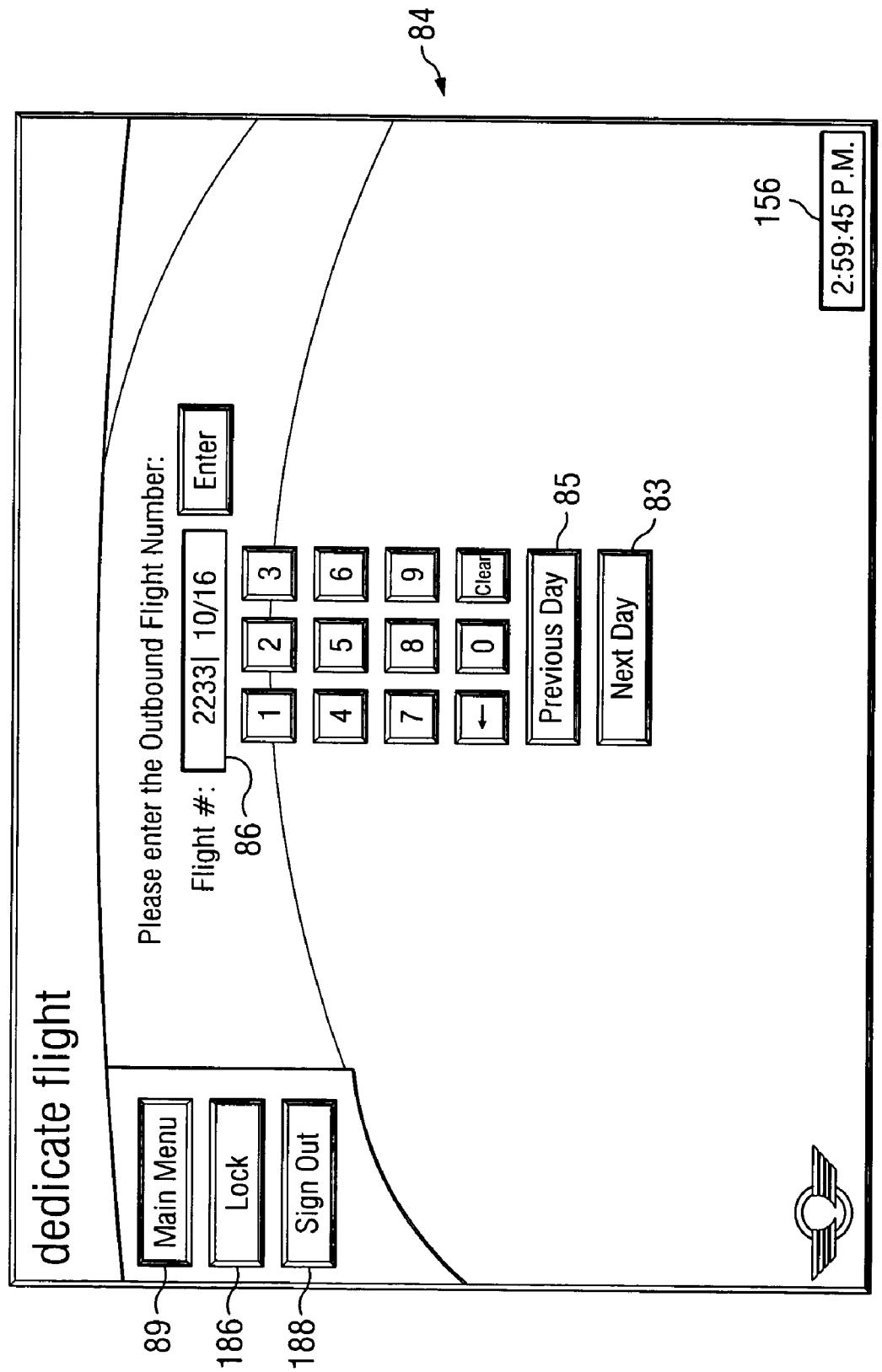
FIG. 6 is a carrier designation screen that may be provided on the display device of the monitoring system terminal of FIG. 2.

Once the user is signed into the boarding terminal, a carrier event dedication screen 84 (FIG. 6) appears. A carrier event identifier, such as a flight number, is entered into the event field 86. Next day or previous day options 83, 85 may also be provided, with the date displayed in event field 86. Entering of a valid carrier event will cause the monitoring system 20 to access stored current event data and information, including carrier and passenger information, that may be stored in the central computer or data system 12. Such information is thus available and can be displayed on the monitor 54 of the boarding terminal 20 upon inquiry instruction input. For ease of description, like or similar components or elements may be provided with the same reference numeral(s).

A main menu or other option screen 88 (FIG. 7) may be provided with various operation options, such as those shown on option screen 88. The following illustrates the various functions or operations that may be performed using the passenger monitoring system for the individual carrier events. A main menu option 89 may be provided on most screens provided on the display device 54 to facilitate navigating to the main option screen 88.

Figure 8:
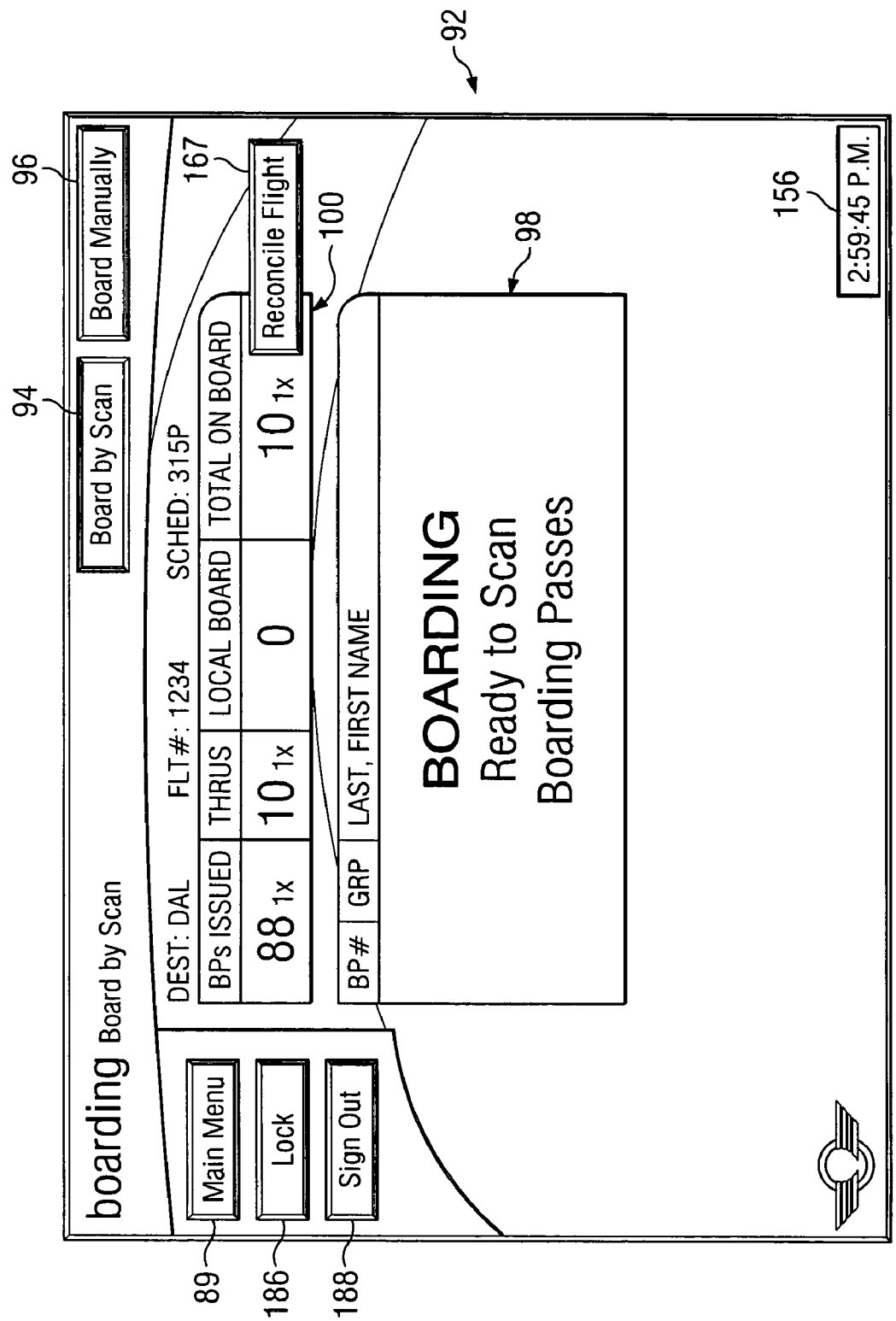
FIG. 8 is a boarding screen that may be provided on the display device of the monitoring system terminal of FIG. 2.

Upon selection of the board option 90 of the menu screen 88, the application will provide a boarding screen 92 (FIG. 8) that will appear on the monitor 54. The boarding screen 92 is provided with boarding method options in the form of automatic and manual boarding options 94, 96. Upon selection of the automatic boarding option 94, the system is readied to begin reading passenger-data items (not shown), which may be in the form of a boarding pass with a bar code or other readable data thereon that is capable of being read by the reader 70. A message or information field 98 may be provided to display various information, such as an indication that the monitoring system is ready for scanning or reading of boarding passes, as shown in FIG. 8. Alternatively, the automatic boarding option may be automatically selected by merely passing a non-boarded passenger boarding pass or passenger-data item under the reader so that it is read by the reader.

A board condition field 100 may also be provided on the screen 92. The board condition field 100 may contain current information that is received from the central computer system 12. This information may include such things as the number of boarding passes issued, number of continuing or "thru" passengers associated with the flight or event, the number of locally boarding passengers, and the number of passengers already boarded.

Upon boarding, passengers may present their boarding passes to the gate agent or boarding overseer for scanning by the reader 70. The gate agent may scan or have the passenger pass the boarding pass with the barcode under the scan field of the reader 70. A successful or unsuccessful scan may be reflected by a light (not shown) and/or audible indication that may be provided by the reader or monitoring terminal. Additionally, different indications, such as different lights or different audible indications, may be provided based upon the type or status of the passenger or the information read to inform the gate agent of such status or information.

The data or information collected by the reader 70 is transmitted to the central data base or system 12, where the stored carrier and passenger information for the carrier event contained therein is updated with the collected data. This collected data or information may also be compared to the stored carrier and passenger information with an instruction or prompt being provided to the monitoring terminal 20 on the display device 54. An audible indication may also be provided from the monitoring terminal 20 to communicate that such instruction or prompt has been received. The transmission of individual passenger data between the terminal 20 and central system 12 and the updating of the carrier and passenger data so that it is available at the monitoring system may occur rapidly so that the information is immediately available. In particular, this may be less than 5 seconds, less than 3 seconds, and more particularly 1 second or less.

Figure 9:
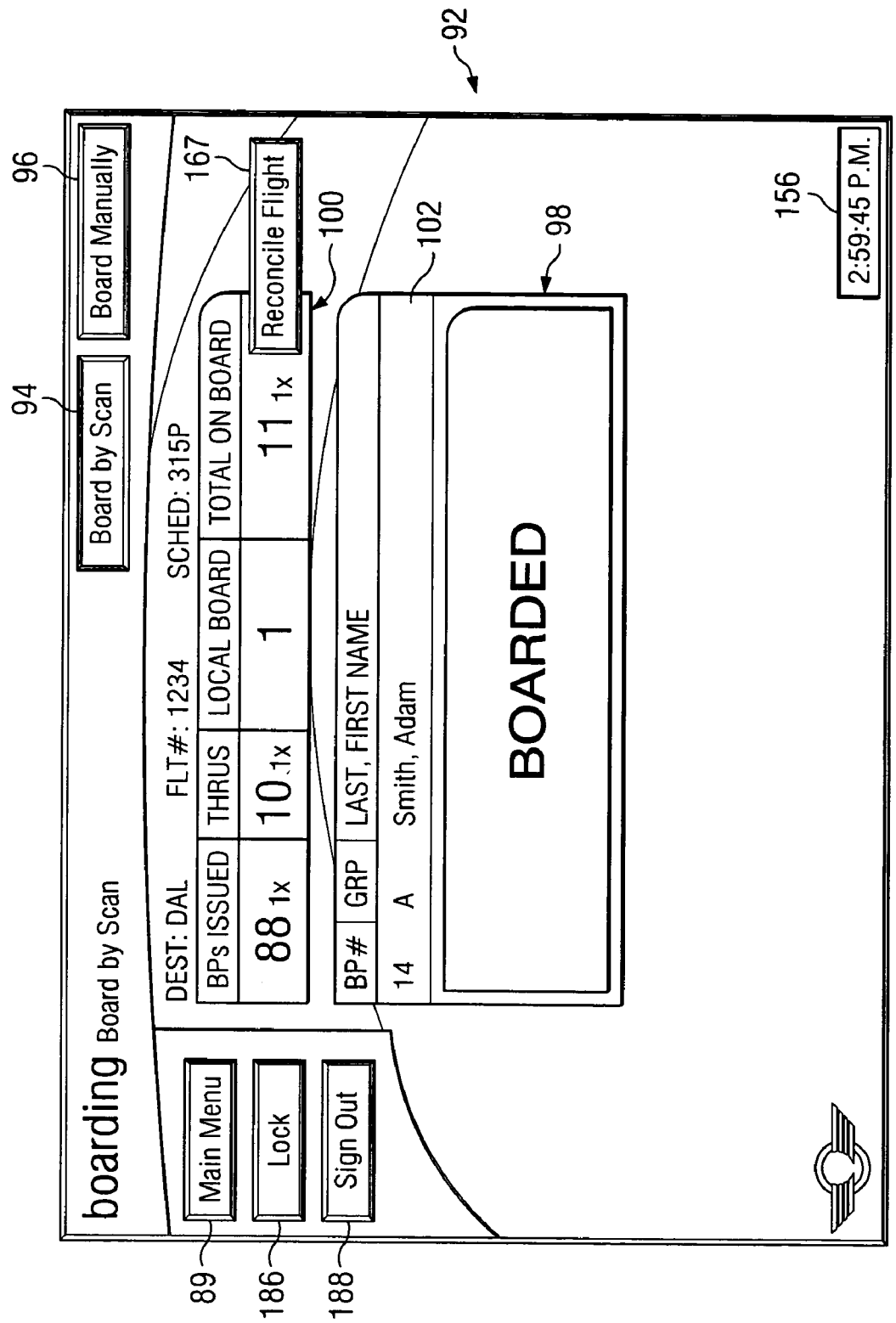
FIG. 9 is a boarding screen with a confirmation notice that may be provided on the monitoring system terminal of FIG. 2.

Upon a successful scan, the collected individual passenger information may be displayed in an individual passenger field 102 (FIG. 9) of the information field 98. This may include the passenger's boarding pass number or other identifier, the name of the passenger or passenger identifier, a boarding group identifier or designation, or other information, such as ticket status or selectee status. An indication of boarded status may also be displayed, such as the word "boarded" in the information field 98 to indicate that the passenger has been validated for boarding and such status has now been recorded and stored. The board condition field 100 is also updated and displayed to reflect the updated board condition for the carrier event. The application is then ready to scan the next passenger boarding pass.

When the collected passenger information is compared to the stored passenger data of the system 12, a comparison result may be provided to the monitoring terminal 20. This may be in the form of a non-validation status indication that is displayed on the display device 54. An audible indication of such status may also be provided to indicate that the boarding pass is not valid, such as when the boarding pass does not correspond to the particular carrier event or when the passenger is indicated as being already boarded. Additionally, a prompt or indication that further action must be taken before boarding of the passenger can continue may be displayed on the display 54.

Figure 10:
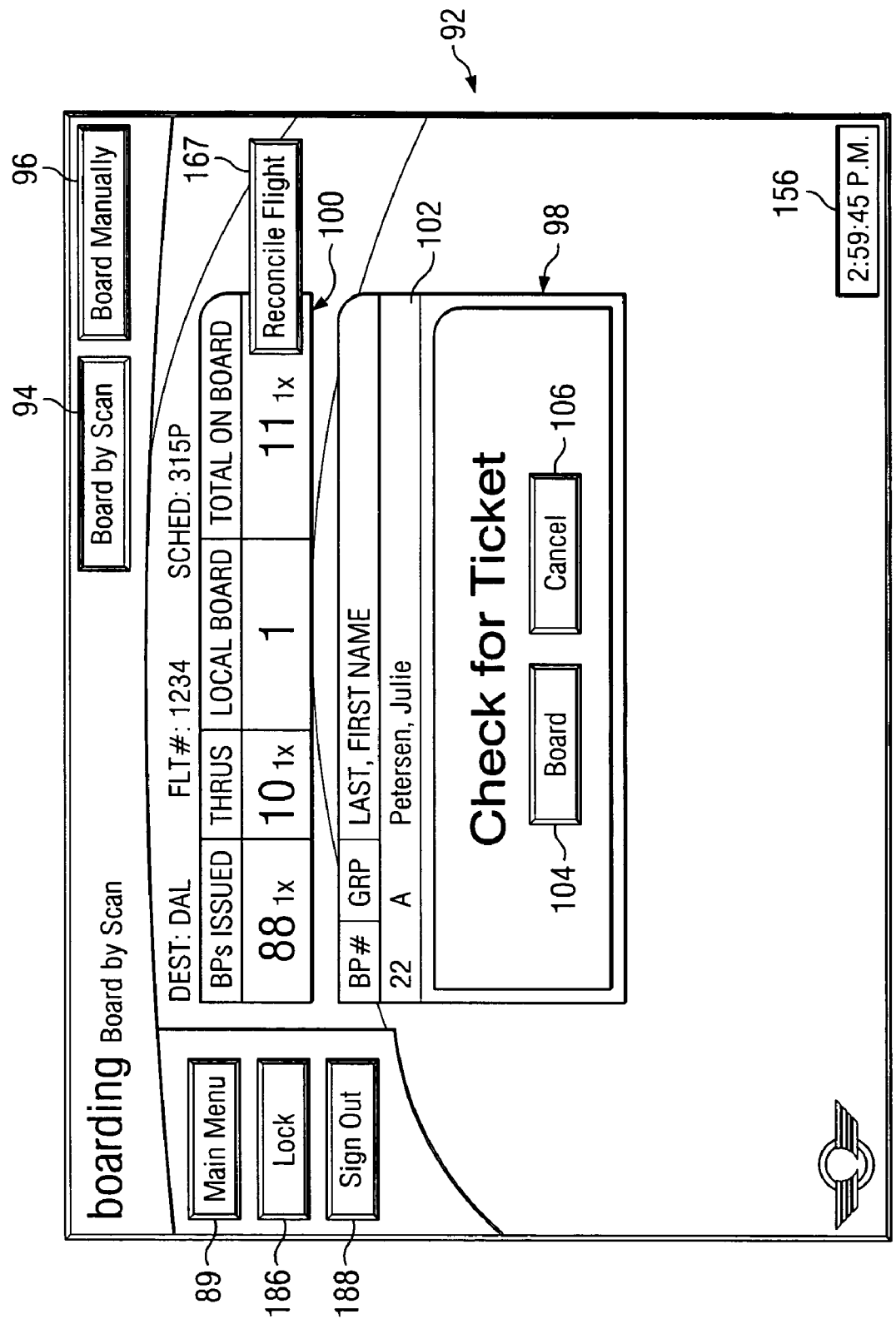
FIG. 10 is a boarding screen with a check-ticket prompt that may be provided on the display device of the monitoring system terminal of FIG. 2.

Referring to FIG. 10, a notification is provided in the information field 98 to prompt the gate agent or overseer to check for the passenger's ticket or that the passenger has been designated a "selectee" i.e. those that have been selected for further screening, such as for security measures and the like. Such prompting or designations are provided from the central system 12. It should be noted that the information field 98 and other areas of the screen 92 may have different colors or appearances to indicate the particular prompt or operation occurring. An option menu having board and non-board options 104, 106, respectively may appear as part of the prompt. When the option menu appears, other functions of the board screen 92 may be disabled. When such option appears, the gate agent may check for the passenger's ticket or conduct further screening of the selectee passenger. If the ticket is provided or further screening has been conducted, the agent may select the board option 104. This will transmit and update the passenger data for of the central database 12, the condition field 100 and the application may be returned to the ready-to-scan mode for the next boarding pass.

If no ticket is provided or further screening is required, the gate agent may select the cancel option 106 and take the appropriate manual action. Canceling boarding of the passenger will return the application the ready-to-scan mode without updating the condition field 100.

Figure 11:
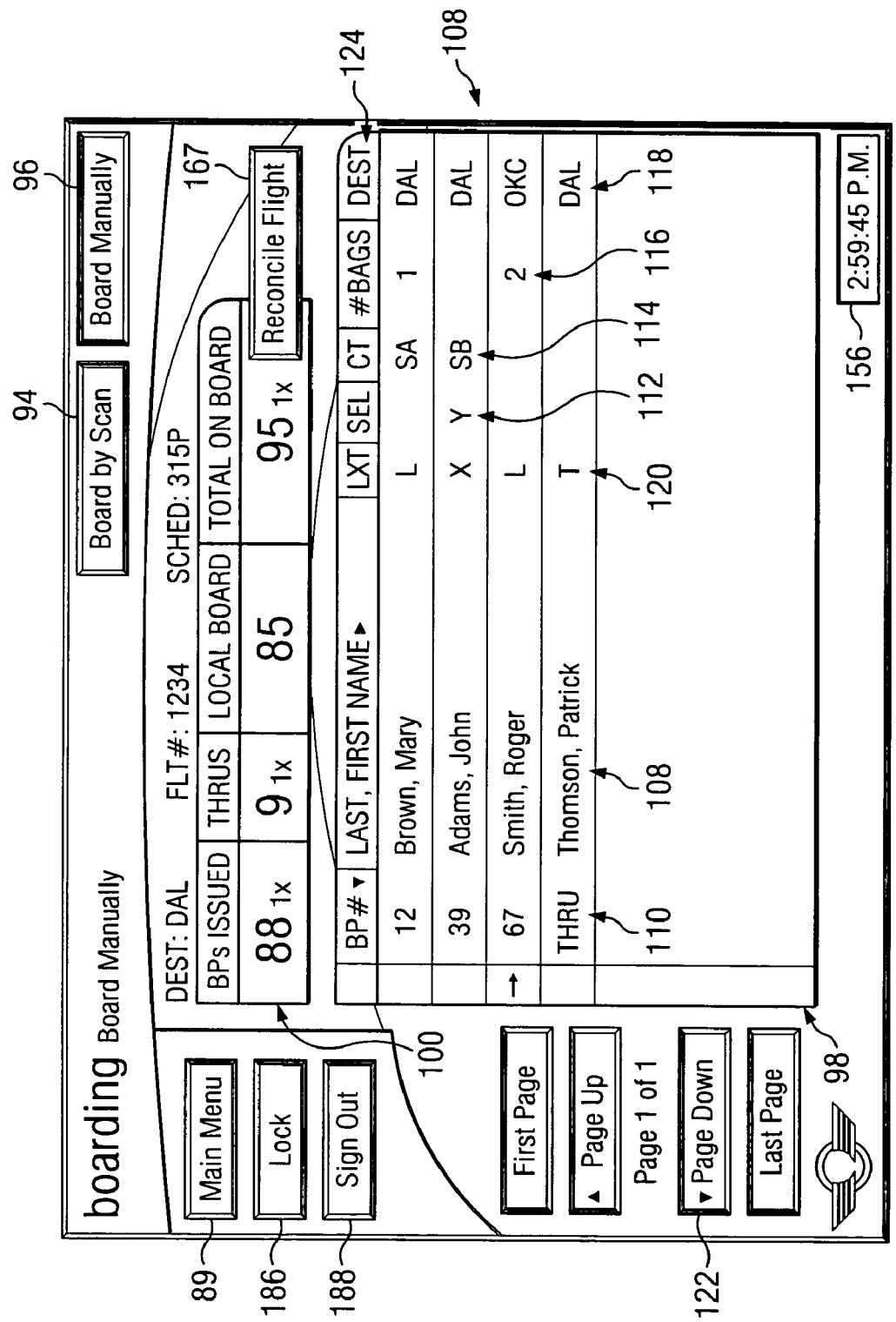
FIG. 11 is a manual boarding screen that may be provided on the display device of the monitoring system terminal of FIG. 2.

Referring to FIG. 11, when the gate agent selects the "board manually" option 96 during the boarding action a manual board screen 108 will appear. In the information field 98, a list of current passenger information available for boarding associated with the carrier event is retrieved from the central database 12. The list may include passenger information for disembarked, continuing passengers ("thrus") and local boarding customers. The listed information may include the passenger name or identifier 108; the passenger's boarding pass number or identifier 110; selectee status 112; the passenger type (such as revenue passenger, non-revenue passenger, standby passenger, etc.) 114; bag information, such as the total number of bags checked for each passenger 116; final destination identifier 118; and a local, thru or transfer (LTX) identifier 120.

Navigation options or buttons 122 may also be provided on the display 54 to facilitate scrolling or locating desired listed passenger information. Listed information headers 124 may also be provided that can be selected to display information in sequence for that particular header. The gate agent may select the desired passenger from the list of passengers. Upon such selection, a confirmation prompt may be provided in the information field 98 with affirmative and negative confirmation menu options 123, 125 for such confirmation. Upon affirmative confirmation, the boarding passenger information is transmitted to the central data base or system 12, where the stored carrier and passenger information for the carrier event contained therein is updated with the selected or collected data. A board screen similar to the board screen of FIG. 9 may appear, along with the selected passenger information in the information field 102, to indicate that the passenger was successfully boarded. The board condition field 100 is also updated to reflect the updated boarded total.

Alternatively, upon selection of the boarding passenger from the list of passengers, a prompt to "check ticket" or to conduct further screening may appear, such as shown in FIG. 10. The procedure for such occurrences is handled generally the same as described above with respect to the boarding by scan operation.

After the boarded message of the board screen is cleared, which may occur after a brief display period, the application returns to an updated listing of available passengers for boarding for the next manual board operation.

Figure 13:
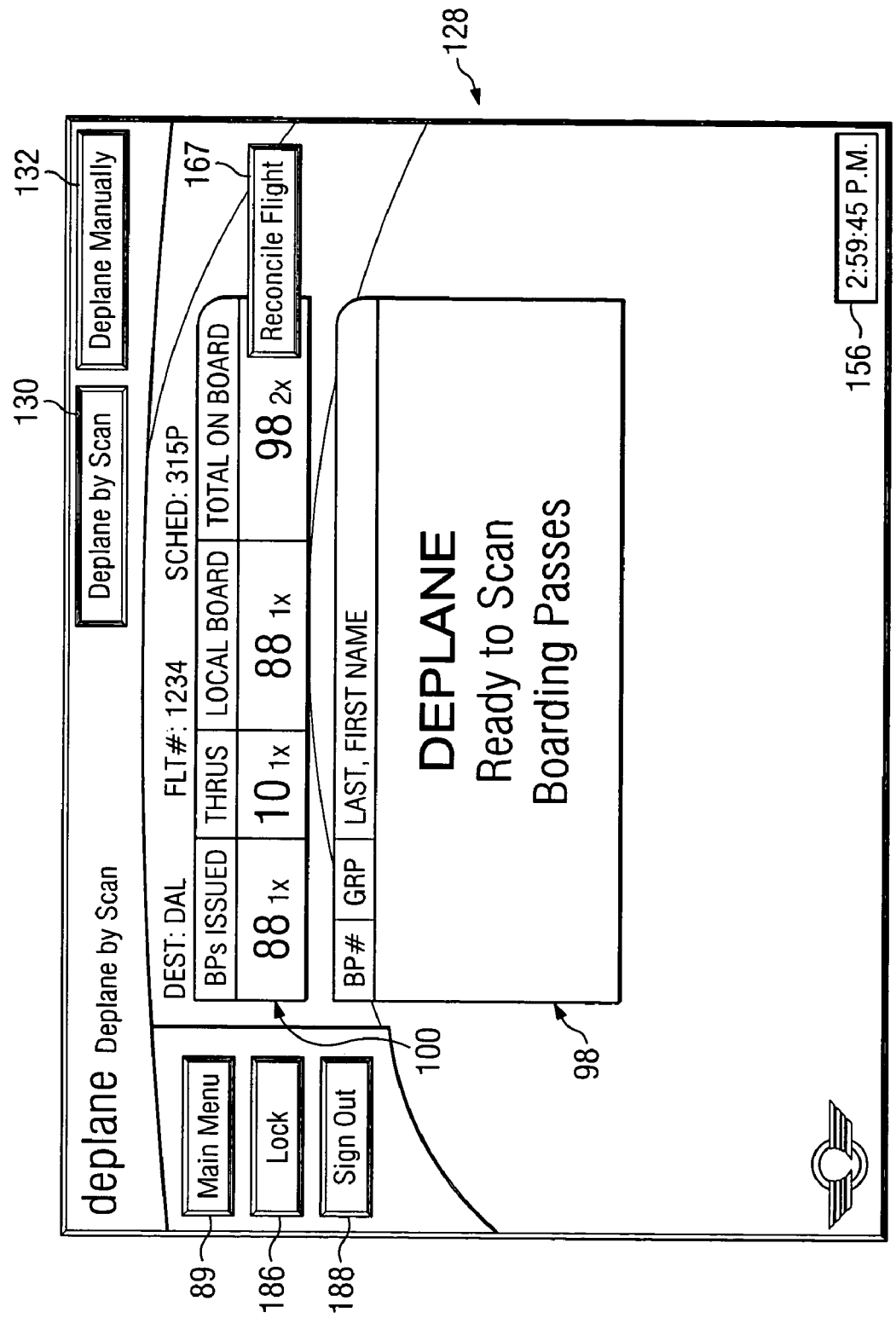
FIG. 13 is a disembark screen that may be provided on the display device of the monitoring system terminal of FIG. 2.

If an individual boarded passenger disembarks from the carrier, the gate agent may select an individual disembark option 126 from the main menu 88. Selecting the individual disembark option 126 provides an individual disembark screen 128 (FIG. 13). Disembarking may be carried out automatically by scanning the individual's boarding pass or manually entering the information in a similar manner to that done during boarding operations as previously described. When the disembarking passenger's boarding pass is scanned, the passenger information is transmitted to the central database 12 where it is compared and validated for disembarking. The stored passenger information is updated and is reflected by displaying an indicator that the disembarking operation was successful in the information field 98. The individual passenger information may also be displayed in the field 102. The board condition field 100 is also updated to indicate the change in the boarded condition. If disembarking occurs prior to the carrier departure, the passenger boarding pass may be made available for boarding again. Upon disembarking, the application is returned to the ready-to-scan mode for the next disembarking passenger.

A non-validation status indication may also be provided on the information field 98 after comparison with the data of the central system 12 upon disembarking. Such status may be provided in instances where the passenger has not yet been reflected as boarded or the boarding pass is for a different carrier event. An audible indication of the valid or non-valid status may also be provided.

Manual disembarking of individual passengers may be carried out by selecting the manual disembarking option of the automatic and manual disembarking options 130, 132. Manual disembarking of individuals is carried out in a manner similar to manual boarding. Selecting the manual option 132 provides a manual disembark screen 134 similar to the board screen 92 of FIG. 11. A list of all available passengers available for disembarking is displayed in the information field 98, which may include passenger information that is the same or similar to that previously described for manual boarding.

Figure 12:
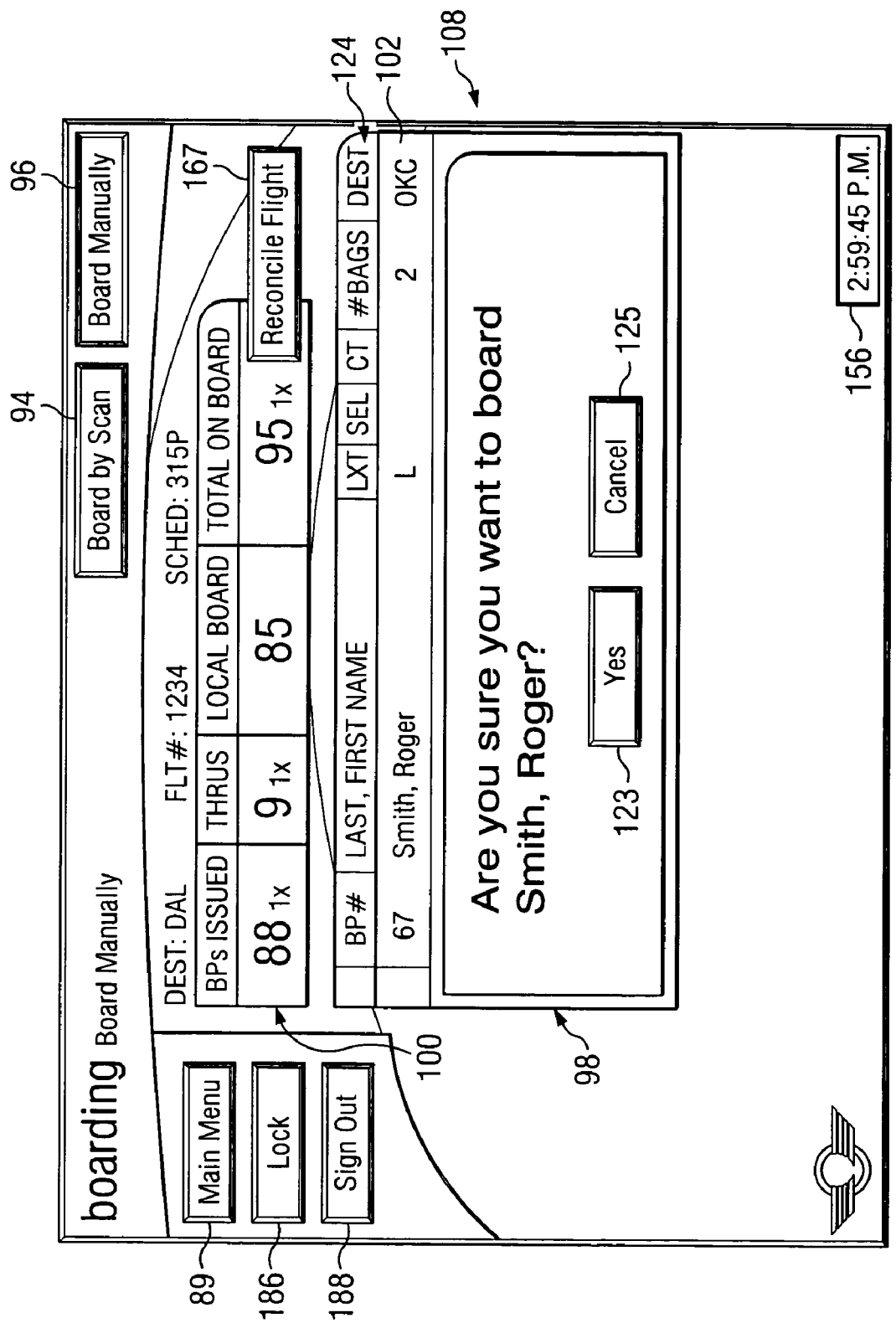
FIG. 12 is a manual boarding screen with a confirmation prompt that may be provided on the display device of the monitoring system terminal of FIG. 2.

The navigation options or buttons 122 are also provided on the display 54 in the manual disembarking mode to facilitate scrolling or locating desired listed passenger information. The gate agent may select the desired passenger for disembarking from the list of passengers. Upon such selection, a confirmation prompt may be provided in the information field 98 with affirmative and negative confirmation menu options (not shown) similar to the menu options 123, 125 (FIG. 12) for confirmation during boarding. Upon affirmative confirmation, the disembarking passenger information is transmitted to the central data base or system 12, where the stored carrier and passenger information for the carrier event contained therein is updated with the selected or collected disembarking data. A disembark screen similar to the board screen of FIG. 9 may appear, along with the selected passenger information in the information field 102, to indicate that the passenger was successfully disembarked. The board condition field 100 is also updated to reflect the updated boarded total.

Figure 7:
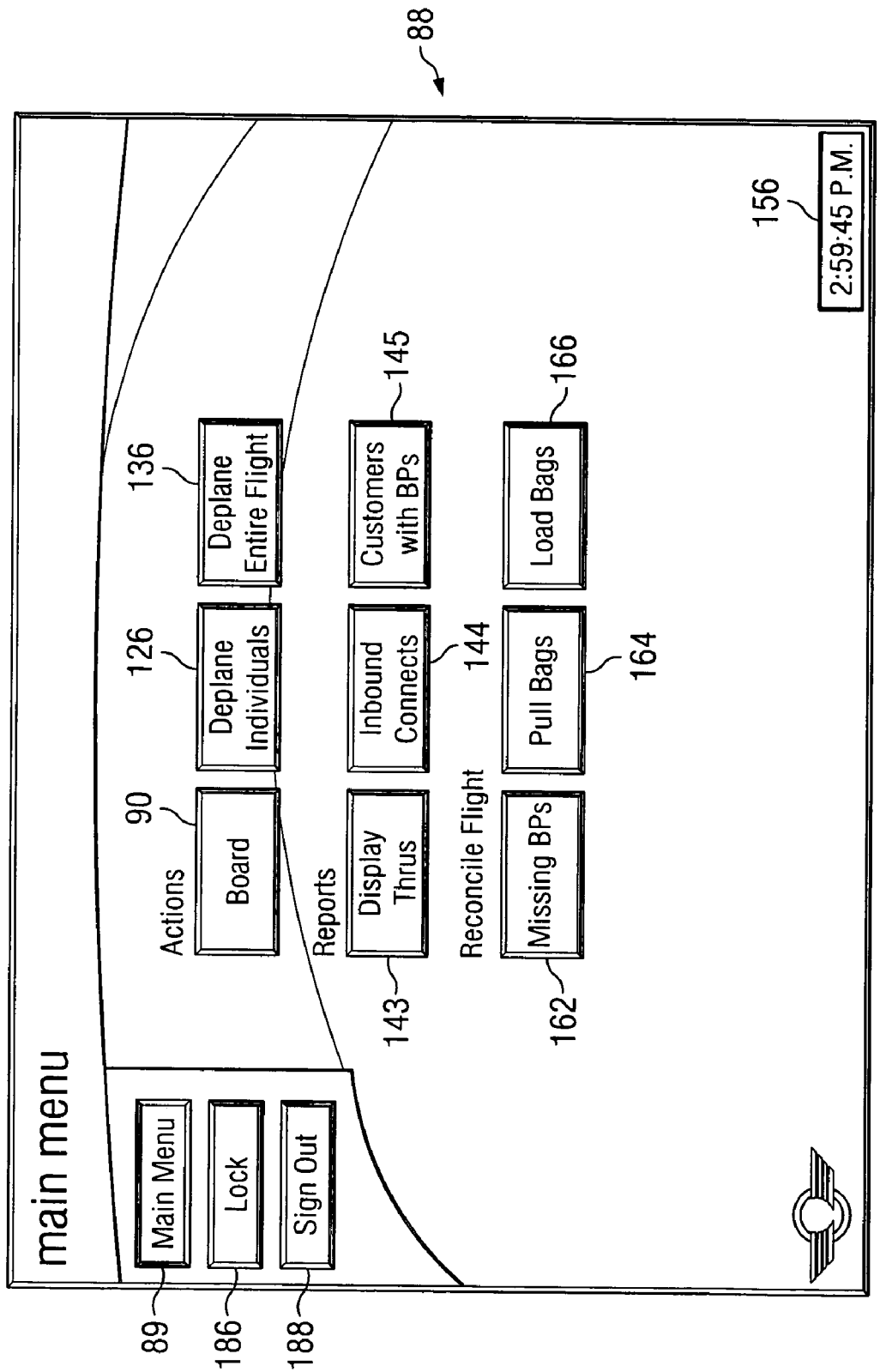
FIG. 7 is a main menu screen that may be provided on the display device of the monitoring system terminal of FIG. 2.

A means for disembarking an entire carrier event is also provided. To disembark a carrier event, a user selects the disembarking option 136 from the main menu 88 (FIG. 7). This provides a disembarking carrier event selection screen (not shown) similar to the dedication screen 84 wherein the user may enter a carrier event identifier (such as a flight number) into an event field, such as the event field 86 of screen 84. Entering of a valid carrier event will cause the monitoring system 20 to access stored current event data and information, including carrier and passenger information, that may be stored in the central computer or data system 12 for the selected carrier event.

Figure 14:
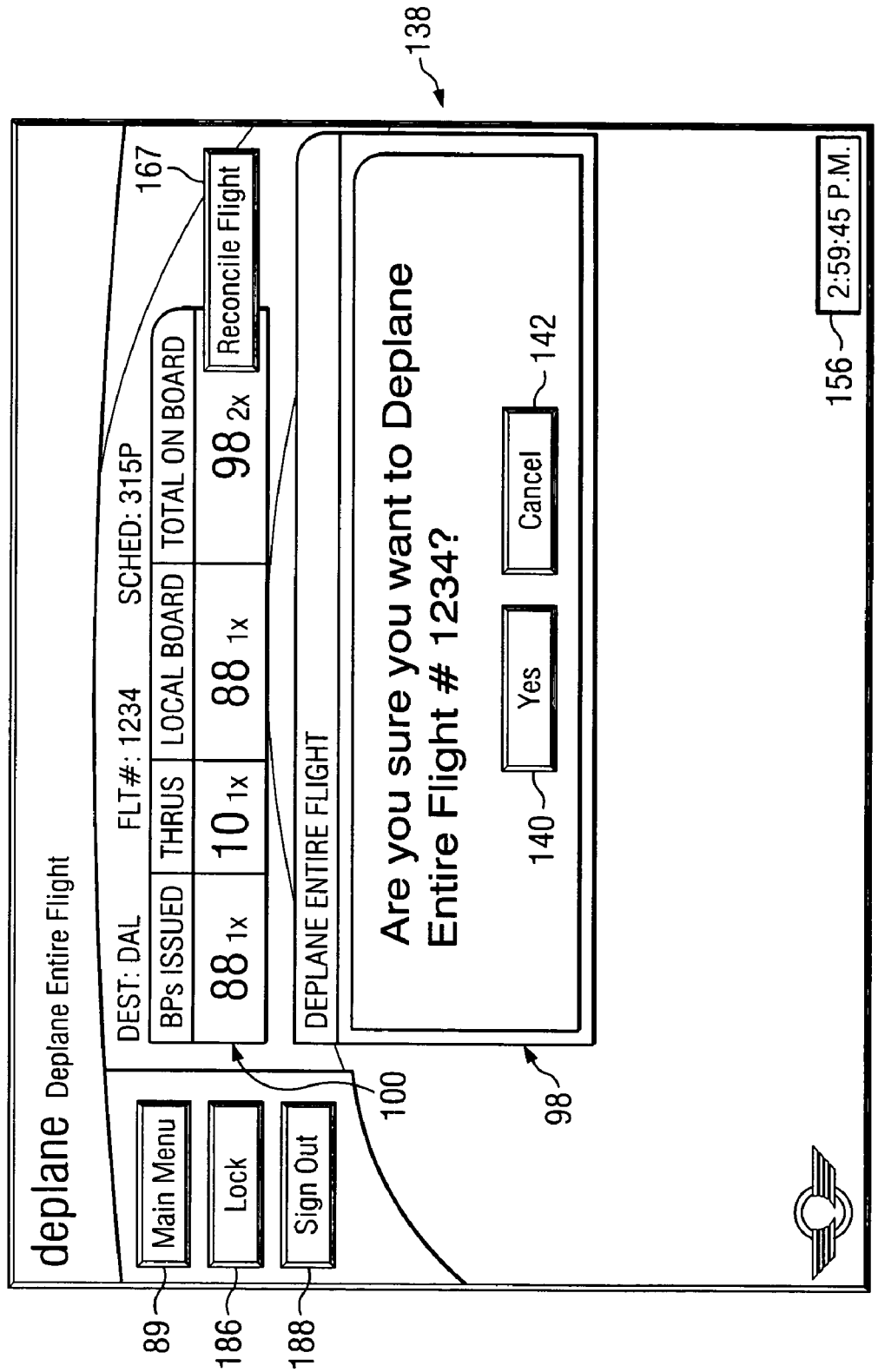
FIG. 14 is a disembark screen with a confirmation prompt that may be provided on the display device of the monitoring system terminal of FIG. 2.

Upon entering of the event identifier, the identifier is verified with the data of the central system 12. Upon verification a carrier event disembarking screen 138 (FIG. 14) will appear on the monitor 54. Affirmative and negative confirmation menu options 140, 142 are provided to allow the user to confirm or cancel disembarking of the carrier event. Upon confirmation, a disembark request for the carrier event is transmitted to the central system 12. The central system 12 changes the status of each boarded passenger to off or disembarked and returns a message 140 (FIG. 15) that the disembarking operation was successful, which is displayed in the information field 98 of the disembarking screen 138. Additionally, the board condition field 100 is updated to reflect the updated totals of boarded passengers, which will now be zero since all the passengers have disembarked. A selectable option 142 is also provided on the screen 138 to clear the message 140. This also causes the application to return to the main menu screen 88 (FIG. 7).

The monitoring system 20 also allows a user or gate agent to perform other reporting or monitoring operations besides boarding and disembarking of passengers for a particular carrier event. Upon selection of the carrier event, such as through the selection screen 84 (FIG. 6), reporting options for the display of continuing or thru passengers 143, connecting or inbound passengers 144, and passengers with boarding passes 145 may be provided on the main menu screen 88.

Figure 15:
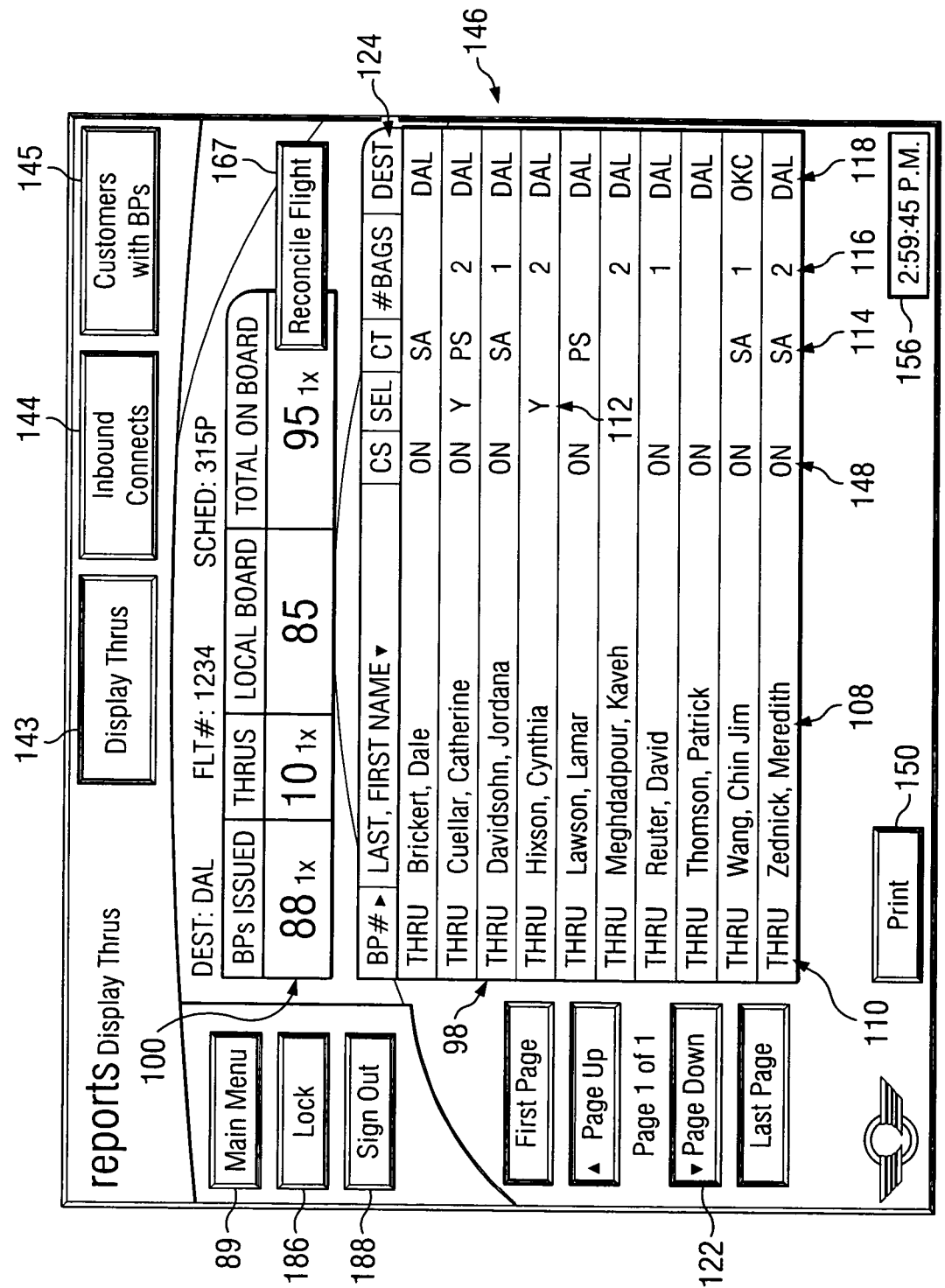
FIG. 15 is a continuing passenger screen that may be provided on the display device of the monitoring system terminal of FIG. 2.

A user may be able to display or list information for continuing or thru passengers for a particular carrier event by selecting a continuing passenger display option 143 from the main menu screen 88. Selection of the continuing passenger display will cause the application to present a continuing passenger report screen 146 (FIG. 15). This report screen 146 may be similar to the manual board screen 108 (FIG. 11), with an information field 98 that displays similar detailed passenger information, as previously discussed. The information field 98 will only contain listed information for continuing or thru passengers, however. The passenger information may be listed in alphabetical order to facilitate locating of individual passenger information. In the column 110 for the passenger's boarding pass identifier, the passenger will be designated as a continuing or thru passenger. Additionally, a board status column or field 148 may be provided, listing whether the passenger is boarded or not.

If desired, a print option 150 may be provided on the screen 146 that upon selection instructs the computer printer 38 to print a hardcopy of the information listed on the screen 146. The reporting menu options 143, 144, 145 may also be displayed on the screen 146 to cause the application to switch screens without necessitating a return to the main menu screen 88.

Figure 16:
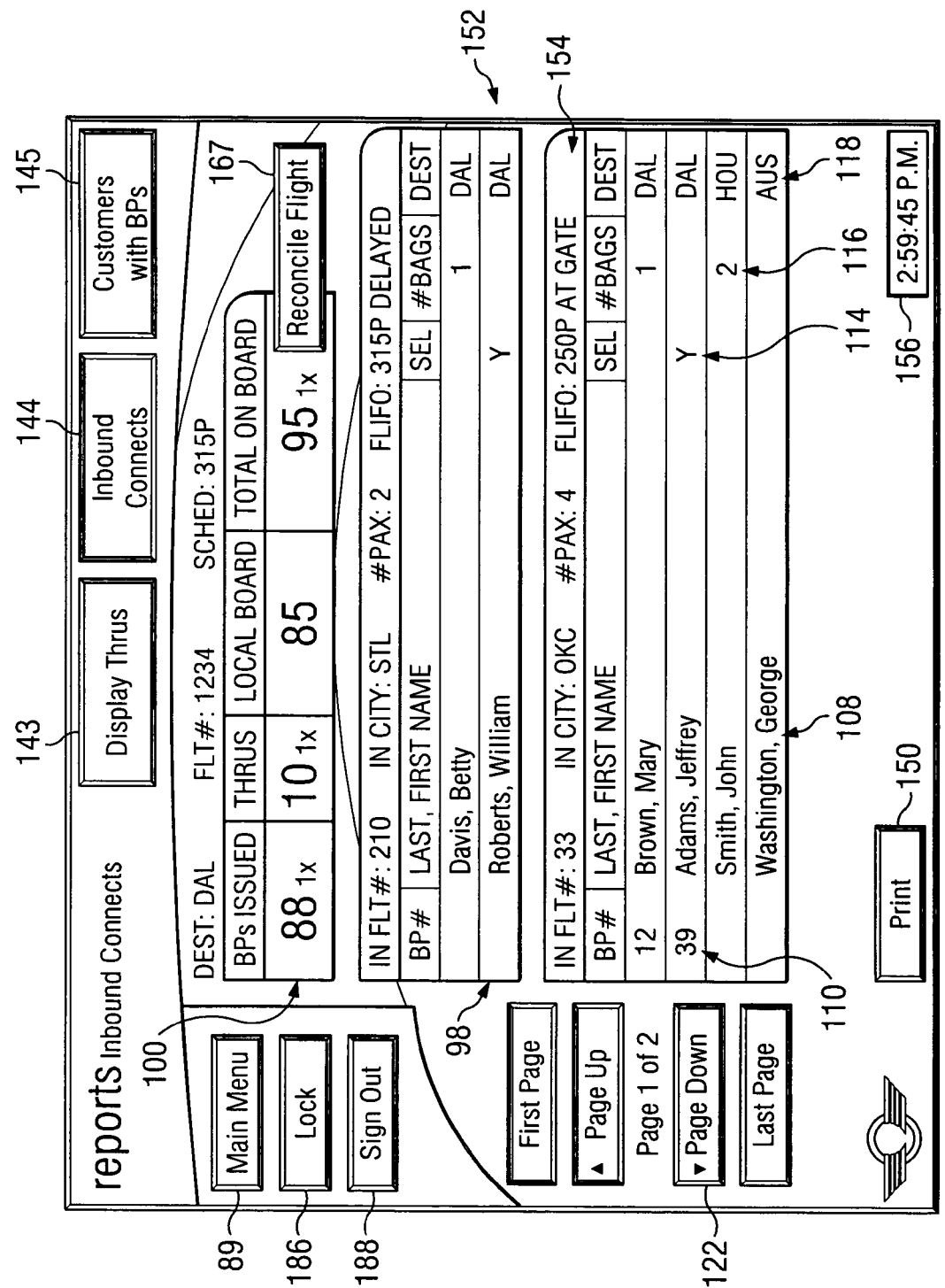
FIG. 16 is a connecting passenger screen that may be provided on the display device of the monitoring system terminal of FIG. 2.

To display information regarding connecting or inbound passengers for a carrier event, the connecting passenger option 144 is selected from the main menu or menu provided on the presented report screen. Selection of the connecting passenger option 144 causes the application to provide a connecting passenger report screen 152 (FIG. 16) listing information regarding non-boarded passengers who boarded in another location on a previous carrier event and which are scheduled to continue on the designated carrier event.

Such information regarding connecting non-boarded passengers is stored in the central system 12, which is provided to the monitoring system 20 upon selection. The information is listed in the information field 98 of the screen 152. The listed information may include a connecting carrier flight or event header 154 for each connecting carrier event. This may include a carrier event number or identifier; an inbound or originating city or location identifier; number of connecting passengers for the dedicated carrier event; and connecting carrier event information, such as estimated local time of arrival and additional comments (egs. "delayed," "cancelled," "arrived," "on time," etc.).

If the current local time, which may be displayed in a time field 156 of each screen of the monitoring application, is earlier than the inbound carrier event's estimated time of arrival or that have not been indicated as having arrived, the header 154 may be highlighted or other indicia may be provided to facilitate quickly assessing such status. The inbound carrier events may be sorted by its actual or estimated arrival time, with the latest arrival time being listed first.

Under the header 154 for each inbound carrier event, transferring passenger information for the inbound carrier event is displayed. The information listed may be similar to the passenger information listed in the passenger information field 98 of the manual board screen 108 (FIG. 11), including passenger name or identifier 108, boarding pass number or identifier, final destination, number of checked bags, etc. Printing of the listed connecting passenger information may be accomplished by selecting the print option 150 provided on the screen 152.

Figure 17:
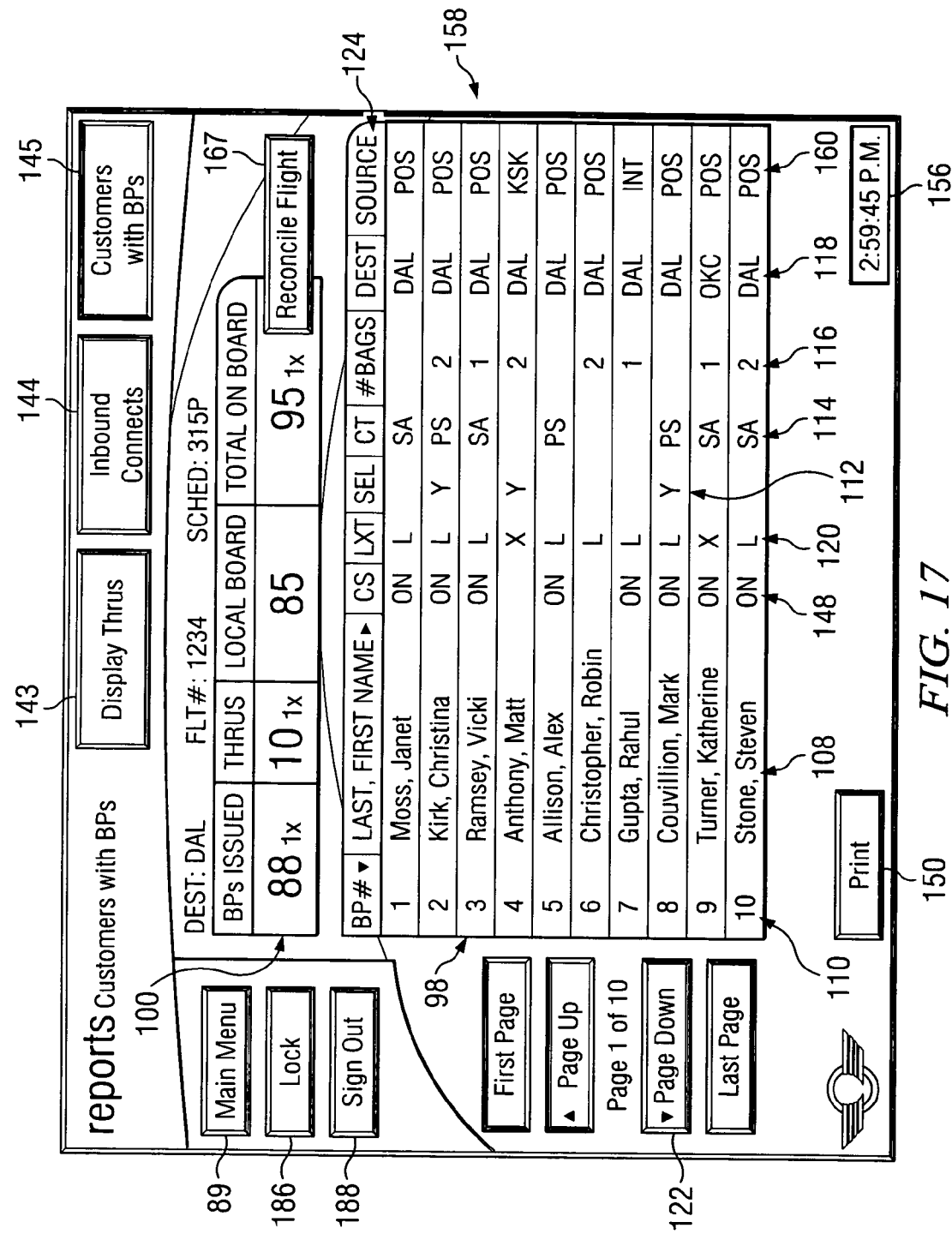
FIG. 17 is a passengers-with-boarding-passes screen that may be provided on the display device of the monitoring system terminal of FIG. 2.

Information regarding passengers with boarding passes for the designated carrier event can be retrieved from the central system 12 and displayed by selecting the menu option 145. Selection of such option causes the monitoring application to provide a report screen 158 (FIG. 17) listing passenger information in the information field 98 for passengers with boarding passes for the designated carrier event. The passenger information may include similar passenger information as that for the screen 108 (FIG. 11), such as passenger identifier 108, boarding pass identifier 110, board status 148, LTX identifier 120, selectee status 112, passenger type 114, number of checked bags 116, final destination 118. Additionally, an issue source identifier 160 for the boarding passes (egs. kiosk, point of sale, internet) may also be displayed for each passenger. The information may be displayed in ascending order by boarding pass number. The various column headers for the passenger information may be selected as well to change the sorting criteria. Printing of the boarding pass passenger information may be accomplished by selecting the print option 150 provided on the screen 158.

Reconciling operations may also be performed using the monitoring system 20 where issued boarding passes for the carrier event are indicated in the system 12 as being issued, but not all boarding passes have been accounted for. In the embodiment shown, reconciling options in the form of missing boarding passes 162, remove bags 164 and load bags 166 are provided. Other options may be provided as well.

Additionally, most other screens may be provided with a reconcile option 167, such as on the board screen 92 (FIG. 8). When there are missing boarding passes, the reconcile option 167 may be provided with an distinctive indicator, such as a distinctive color or variations in appearance such as blinking or flashing animation, etc., to indicate such a missing boarding pass status.

Figure 18:
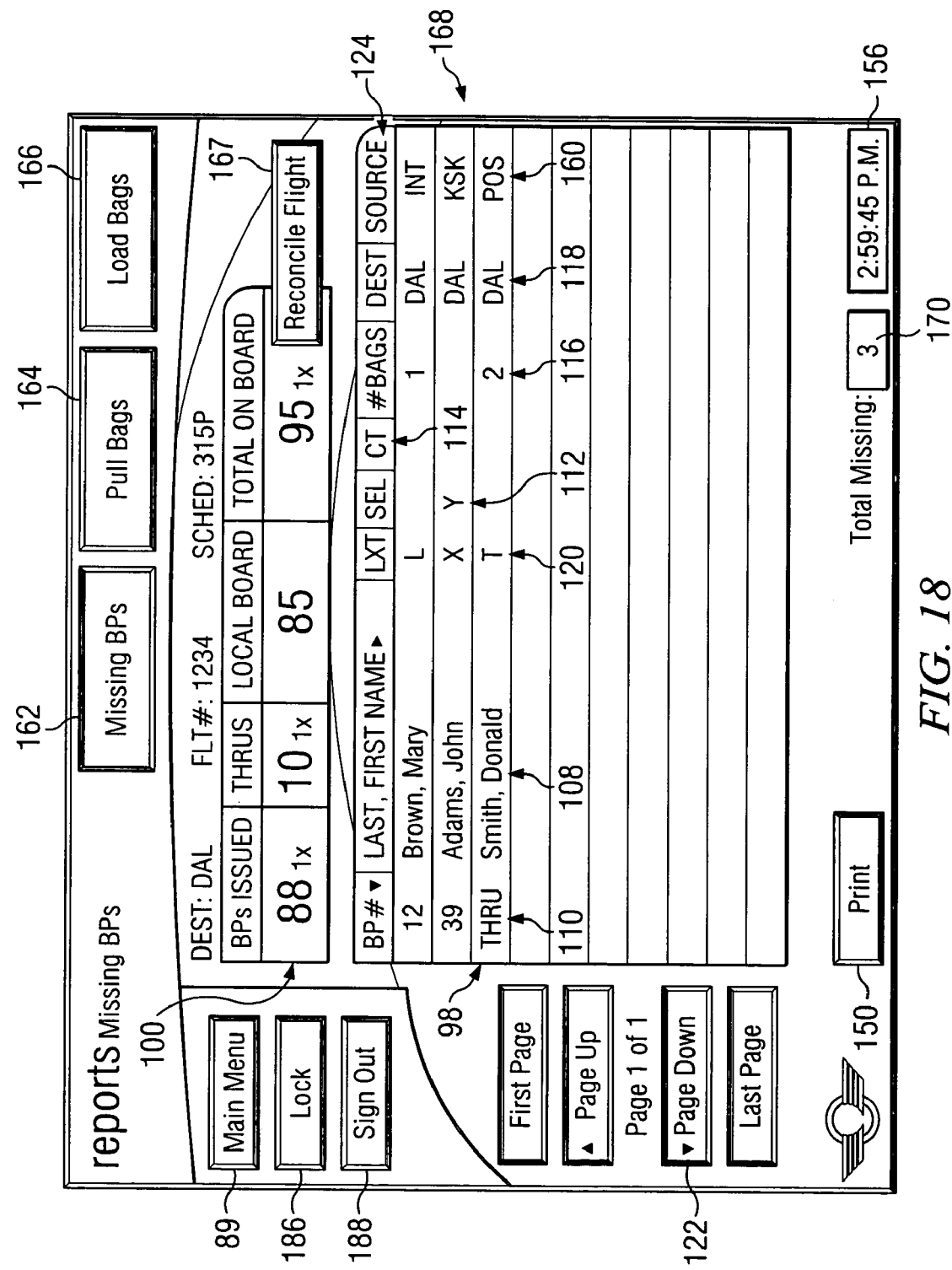
FIG. 18 is a missing-boarding-passes screen that may be provided on the display device of the monitoring system terminal of FIG. 2.

Upon selection of the missing boarding pass option 162 or selection of the reconcile option 167 when there are missing boarding passes, the application will provide a missing boarding pass reconcile screen 168 (FIG. 18) on the monitor 54. The reconcile options 162, 164, 166 may also be provided on the screen 168. A listing of all passengers for the carrier event that have been issued boarding passes is displayed in the information field 98. The information displayed may be similar to that of the information field 98 of screen 108, including boarding pass number, passenger identifier, LTX identifier, passenger type, selectee status, number of bags checked, final destination and issue source of boarding pass. The information may be sorted by boarding pass number or sorted under one of the other column heading criteria. A total number of missing boarding passes will also be displayed on the screen 168 as at 170. The print option 150 allows the user to print a copy of the missing boarding pass information. Boarding condition information is also displayed in the field 100 and may also reflect the total number of missing boarding pass. Knowledge of missing boarding passes may allow the gate agent to page or locate the missing passenger or take other appropriate actions.

Figure 19:
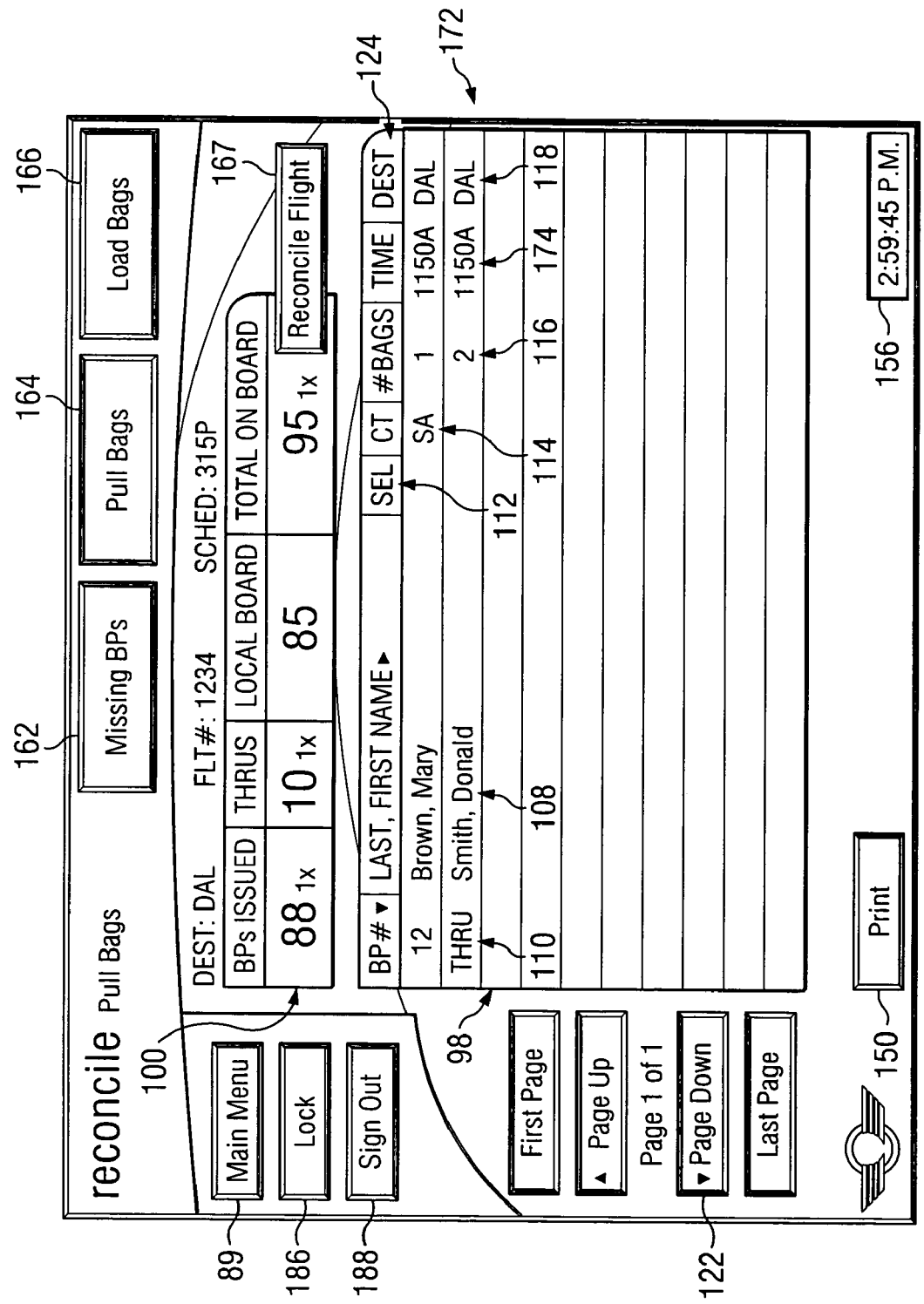
FIG. 19 is a pull-bags screen that may be provided on the display device of the monitoring system terminal of FIG. 2.

Such actions may include preventing the loading of bags on the carrier that have been checked that are associated with the missing boarding pass passengers. By selecting the pull bags reconcile option 164 or from the screen 168, the application will provide a pull bags reconcile screen 172 (FIG. 19). Detailed passenger information is listed in the information field 98, similar to the information listed in the information fields of previously discussed screens. This may include the boarding pass number 110, passenger identifier 108, selectee status 112, passenger type 114, number of bags checked 116 and final destination 118. Additionally, the time the baggage was checked 174 may also be provided. Other identifying information for the bags to be removed, such as bag tag identifiers, may also be listed. Changing sorting sequence of the information may be accomplished upon selection of the appropriate information headers. Printing a listing of the bags for removal may be achieved by selecting the print option 150. The information may be printed from printer 38 and a copy of this may be delivered to baggage handlers or those that may be responsible for removing the bags from the carrier.

Figure 20:
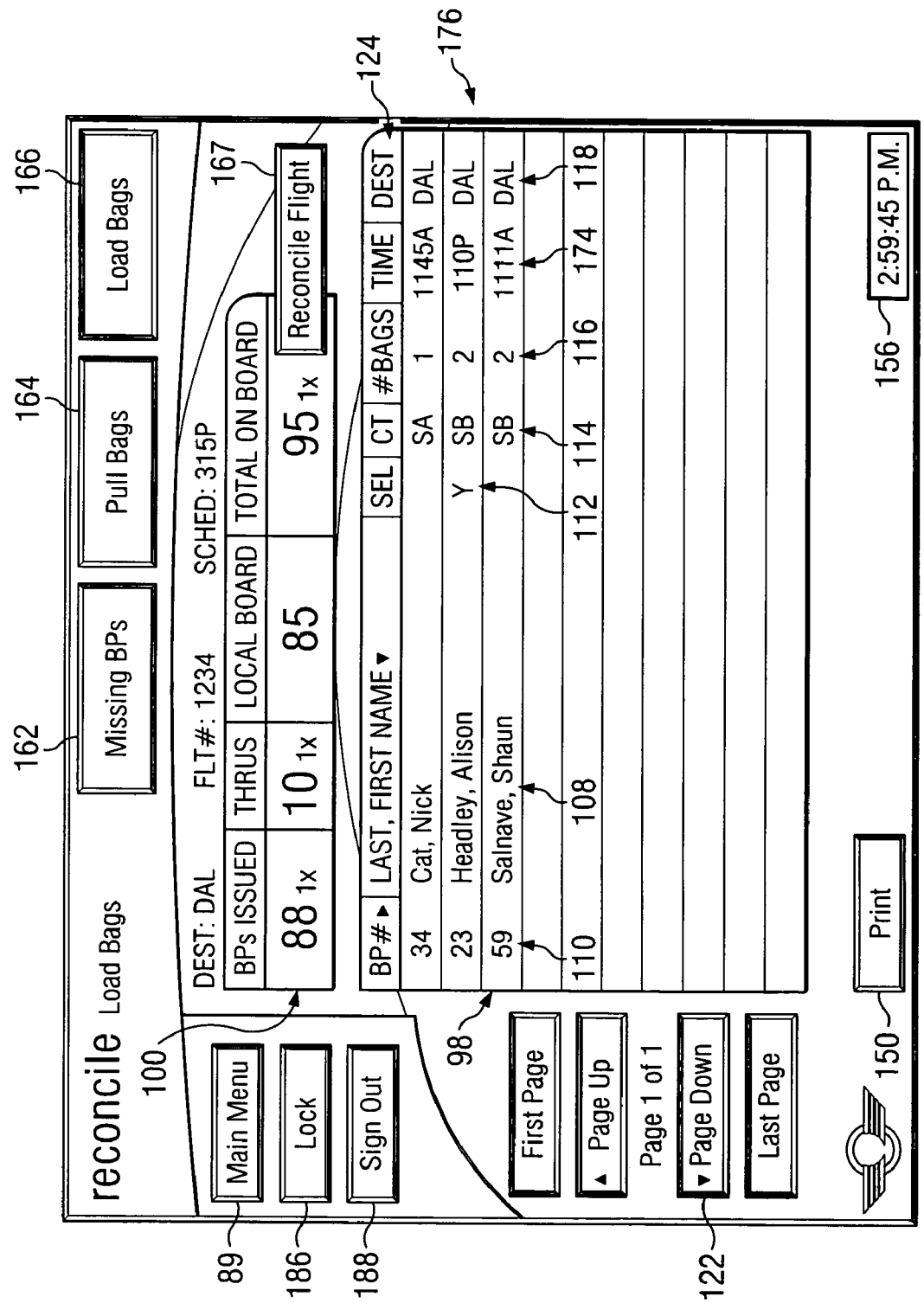
FIG. 20 is a load-bags screen that may be provided on the display device of the monitoring system terminal of FIG. 2.

The load bags reconcile option 166 allows information for boarded, standby passengers with checked bags to be displayed. Selection of this option causes the application to provide a load bags reconcile screen 176 (FIG. 20) on the monitor 54. The same type of information that is displayed in the information field 98 of the pull bags screen 172 (FIG. 19) may displayed in the information field 98 of the load bags screen 176. This information may also be printed by selecting the print option 150. A copy of the printout may then be provided to the baggage handlers or those responsible for loading bags so that the standby passenger baggage may be loaded. Baggage tags may also be generated and printed from the secondary printer 48.

Figure 21:
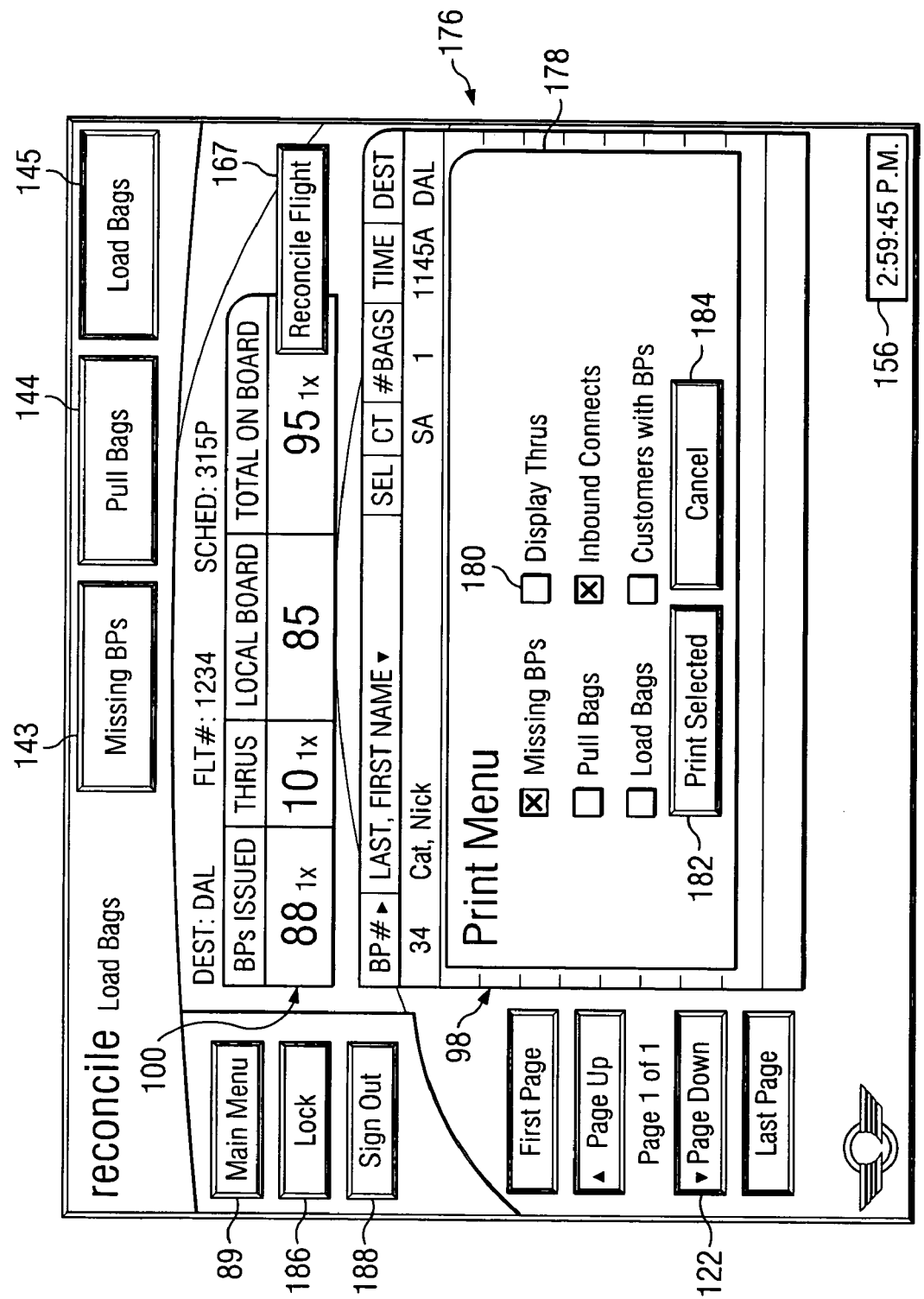
FIG. 21 is a print menu display on a load-bags screen that may be provided on the display device of the monitoring system terminal of FIG. 2.

Referring to FIG. 21, when the print option 150 is selected, the application may provide a print screen menu 178. The print screen menu 178 may have options 180 to select or deselect printing of reports of information, such as the information provided in the report and reconcile screens previously discussed. Options 182, 184 for the confirmation or deselection of the print options may be provided. Upon selection of one of the options 182, 184, the application will return to the previously displayed screen. If the print operation is selected, execution of the appropriate print job will occur.

In addition to the main menu option 89, on most, if not all the screens provided on the monitoring system 20 by the application, a lock option 186 and a sign out option 188 are provided. When the lock option 186 is selected, the monitor will display a screen saver.

Figure 5:
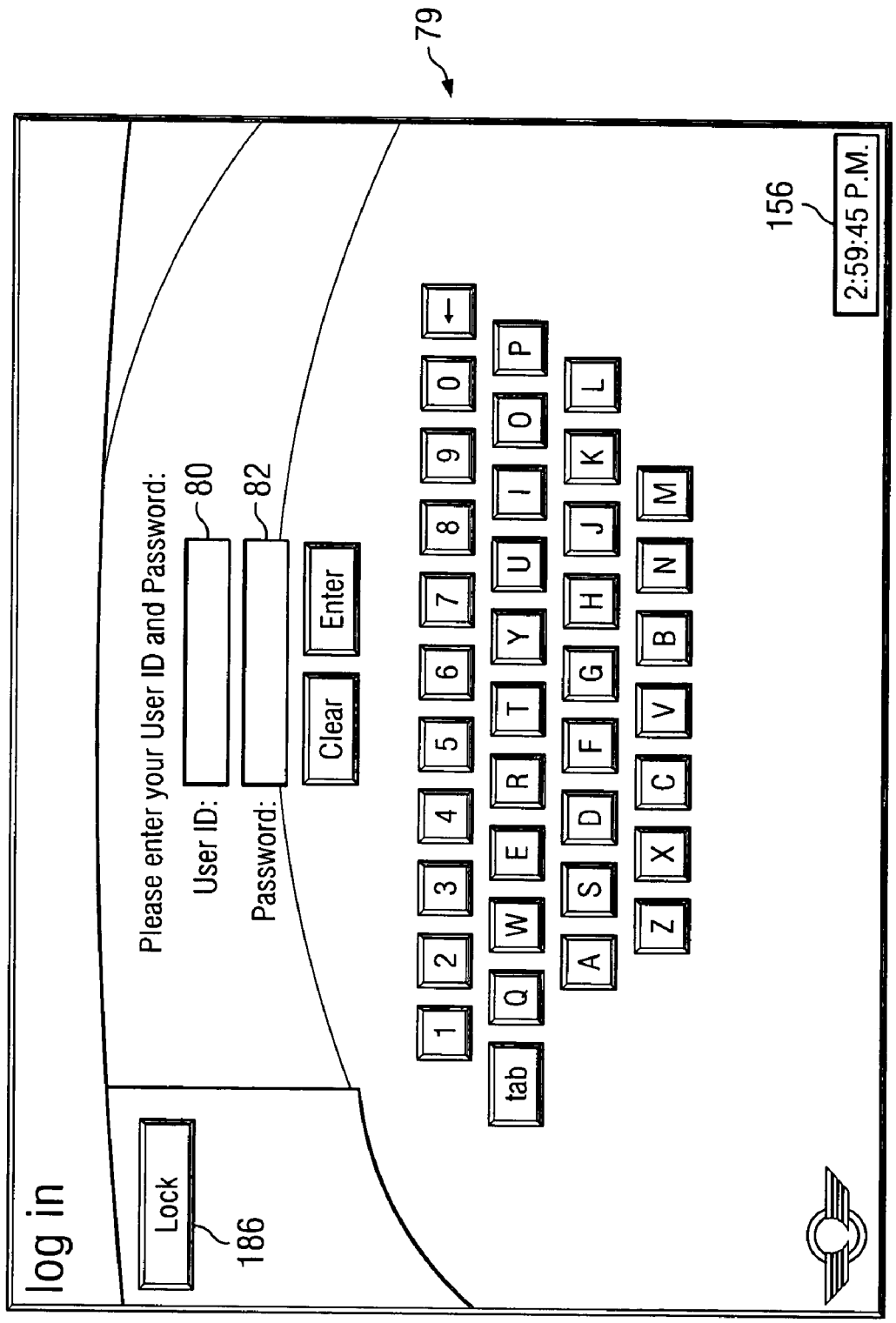
FIG. 5 is a logon screen that may be provided on a display device of the monitoring system terminal of FIG. 2.

By selecting the sign out option 188, a sign out confirmation menu (not shown) will appear over the last viewed screen and confirmation options will allow the user to confirm that the user wishes to sign out of the application. Upon confirmation of sign out, a notification of such sign out will be transmitted to the central system 12 and the application will return to the logon screen 79 (FIG. 5).

The monitoring system application may allow all or selected data from the passenger monitoring operations to be collected based upon the information that was entered or the responses that were received from the central system. Information may also be recorded for record keeping and statistical purposes. This may include such things as the number of boarding passes scanned, the number of passengers boarded, number of passengers not boarded, number of passengers disembarked, number of passengers manually boarded or disembarked, etc. Additionally logging of transaction information may also be made. This may include the transaction types, the user IDs, the gate location of the monitoring system, date/time, the airport or station location, carrier identifier, and the boarding times—including boarding times for individual groups, etc.

The passenger monitoring system and method provides a flexible and detailed means of monitoring and tracking of passengers for carrier events. The gate agent is allowed to greet and observe each individual passenger as they pass by and their boarding passes are presented and scanned during boarding operations, which provides more personal customer service and security during such operations. By providing monitoring terminals at the gate area that provide detailed information regarding passengers and carrier events, the gate agents or overseers are able to take actions that would not be possible otherwise. Thus, for example, by knowing that a connecting passenger's connecting flight has or has not arrived, the gate agent can make decisions as to whether departure of flight or carrier event should proceed or wait further for the arrival of a connecting passenger. Additionally, the gate agent can attempt to locate individual passengers that are listed as not being boarded. Further, the system allows monitoring of passengers that may have boarded and then disembarked. Thus, when a boarded passenger temporarily disembarks prior to departure, the monitoring system can monitor the disembarking activity. The gate agent is thus provided with a record that can be accessed that the passenger is no longer boarded. The system also allows the gate agent to determine if a standby or non-boarded passenger's bag should be loaded or pulled and communicate this to baggage handlers associated with the carrier event.

Further, the information that is collected by the monitoring terminals is provided to a central database or system so that it may be accessed from other remote locations or terminals that are networked with such central system. This provides a convenient means of providing up-to-date, detailed information regarding the boarding and disembarking activities of individual carrier events. Gate agents at the carrier destination for a carrier event can determine if a particular passenger boarded the carrier and can be expected to arrive and disembark from the carrier. The central system can also provide prompts to prompt the gate agent to conduct further screening of the passengers or perform certain functions, such as checking for tickets, etc.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of monitoring passengers during boarding or disembarking from a passenger carrier, the method comprising:
providing a passenger monitoring system at a gateway area for boarding or disembarking of a passenger carrier for a designated carrier event, the passenger monitoring system including a passenger data collecting device, an instruction input device, a video monitor display device and a data processor that is in communication with a remotely located central database containing stored carrier and passenger data for the carrier event;

performing a monitoring system logon operation to allow selected access by an overseer to the central database from the monitoring system;

selecting a carrier event to be monitored with the monitoring system;

providing boarding and disembarking monitoring operation selection options with the monitoring system;

selecting one of the boarding and disembarking monitoring operation selection options;

collecting passenger boarding or disembarking data from at least one passenger with a single inquiry event for each at least one passenger at the gateway area for the selected carrier event with the passenger monitoring system;

comparing the collected passenger data to the stored carrier and passenger data for the carrier event; and providing a comparison result on the display device of the passenger monitoring system based upon the compared collected and stored data, the comparison result including an indication of at least one of a validation status and a non-validation status to indicate to the overseer whether the at least one passenger is authorized for the selected carrier event, and optionally a prompt to check for passenger information for the at least one passenger, and further including displaying at least a passenger identifier for the at least one passenger and a total number of passengers having a validated status for the carrier event on the display device.

2. The method of claim 1, wherein:

selecting one of the boarding and disembarking monitoring operation selection options includes selecting manual boarding or disembarking options, and wherein collecting passenger boarding or disembarking data from at least one passenger includes selecting at least one passenger from a list of passengers or selecting the entire list of available passengers for the carrier event and manually entering boarded or disembarked stabs for said at least one passenger or entire list of available passengers; and further comprising providing a reconcile option that may be selected, wherein information regarding non-boarded or non-disembarked passengers is displayed with the display device upon selection.

3. The method of claim 1, further comprising:

displaying stored carrier and passenger data on the display device that includes at least one of baggage information associated with each passenger, boarding pass identifier and any transitional passenger information.

4. The method of claim 3, wherein:

transitional passenger information includes at least one of connecting and continuing passenger information.

5. The method of claim 4, wherein:

connecting passenger information includes at least one of the total number of connecting passengers for the designated carrier event, identification of the connecting passengers, identification of connecting passengers' incoming carrier events, scheduled time of arrival of the connecting passengers' incoming carrier events, origin of the incoming carrier events and status of the incoming carrier event.

6. The method of claim 1, further comprising:

displaying stored carrier and passenger data on the display device that includes boarded or non-boarded status for each passenger associated with the carrier event.

7. The method of claim 1, wherein:

collecting passenger boarding or disembarking data from at least one passenger at the gateway area with the passenger monitoring system includes collecting disembarking data with the monitoring system from at least one de-boarding passenger having pre-existing boarded status data associated therewith stored in the central data base.

8. The method of claim 1, wherein:

the passenger monitoring system includes a passenger-data item reader in the form of an optical bar code reader; and collecting passenger boarding and disembarking data includes receiving an optical data signal from a passenger-data item associated with a passenger when the item is brought within a proximal distance to the reader.

9. The method of claim 1, further comprising:

displaying stored carrier and passenger data on the display device that includes displaying non-boarded passenger information for the designated carrier event, the non-boarded passenger information including at least one of identification of non-boarded passengers, non-boarded passenger boarding pass information, baggage information associated with each non-boarded passenger and final destination of each non-boarded passenger.

10. The method of claim 9, wherein:

the non-boarded passenger information includes baggage information associated with each non-boarded passenger; and further comprising communicating the non-boarded passenger baggage information from the passenger monitoring system to a baggage handler associated with the designated carrier event to facilitate separation of such baggage from the passenger carrier.

11. The method of claim 1, further comprising:

displaying stored carrier and passenger data on the display device that includes displaying standby passenger information for the selected carrier event, the standby passenger information including a standby designation of standby passengers and at least one of identification of standby passengers, standby passenger boarding pass information, baggage information associated with each standby passenger and final destination of each standby passenger.

12. The method of claim 11, wherein:

the standby passenger information includes baggage information associated with each boarded standby passenger; and further comprising communicating the baggage information of each boarded standby passenger baggage from the passenger monitoring system to a baggage handler associated wit the designated carrier event to facilitate loading of such baggage on the passenger carrier.

13. The method of claim 1, wherein:

the passenger monitoring system includes a printer for printing baggage information on a baggage tag.

14. The method of claim 1, further comprising:

transmitting status indication feedback data from the monitoring system to the central data base in response to the comparison result; and updating the stored carrier and passenger data of the central database with the status indication feedback data.

15. The method of claim 14, wherein:

comparing the collected passenger data, providing a comparison result, transmitting status indication feedback data, and updating the stored carrier and passenger data of the central database occur immediately upon collecting passenger boarding or disembarking data.

16. The method of claim 1, further comprising:
providing a reconcile option that may be selected, wherein information regarding non-boarded or non-disembarked passengers is displayed with the display device upon selection.

17. The method of claim 1, further comprising:
providing a reconcile option that may be selected, wherein information regarding non-boarded or non-disembarked passengers is displayed with the display device upon selection.

* * * * *